Dec. 28, 1954   B. W. AMMANN ET AL   2,698,033
COIL WINDING MACHINE
Filed Nov. 8, 1952   9 Sheets-Sheet 1
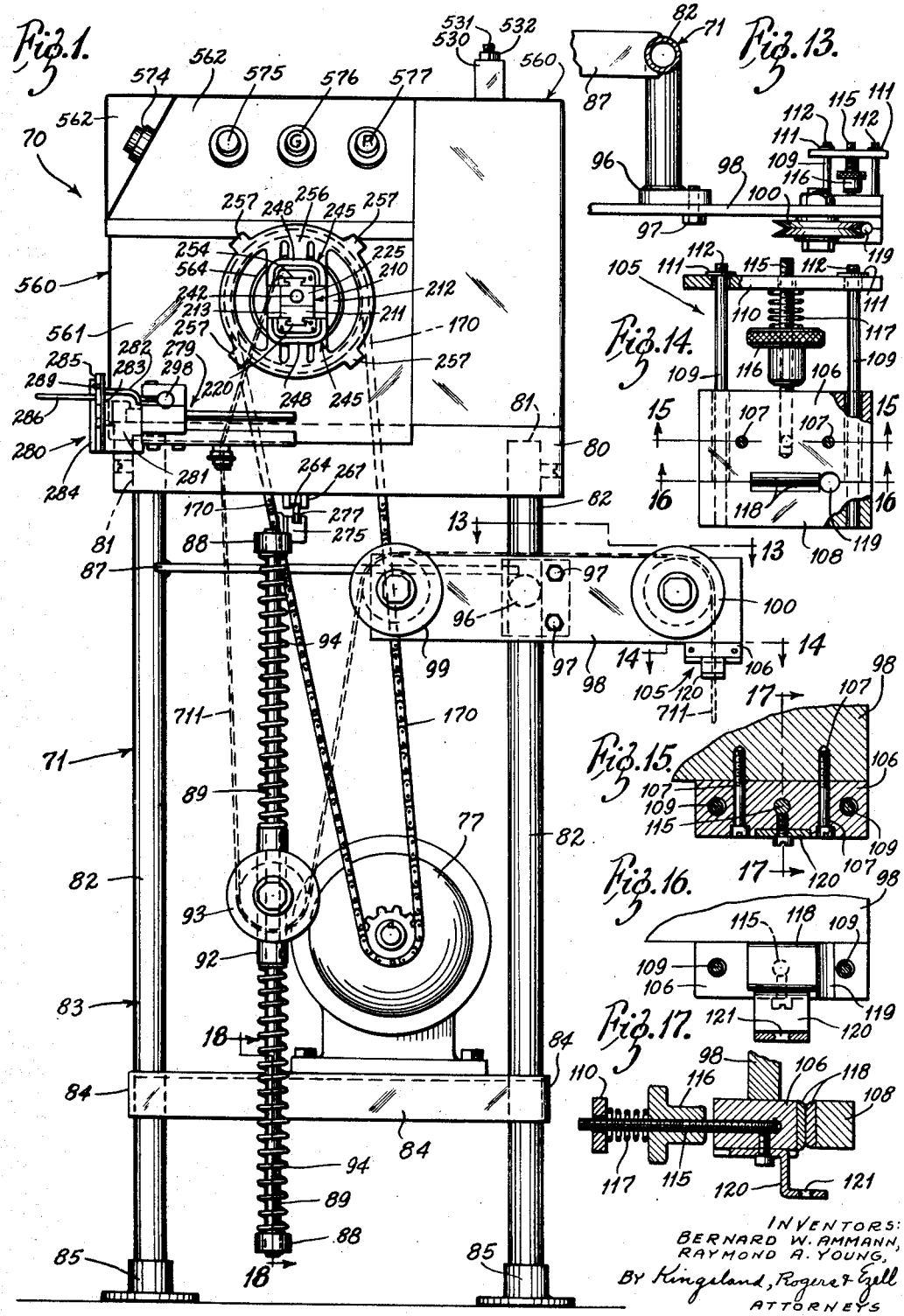
INVENTORS:
BERNARD W. AMMANN,
RAYMOND A. YOUNG,
BY Kingsland, Rogers & Ezell
ATTORNEYS Dec. 28, 1954   B. W. AMMANN ET AL   2,698,033
COIL WINDING MACHINE
Filed Nov. 8, 1952   9 Sheets-Sheet 2
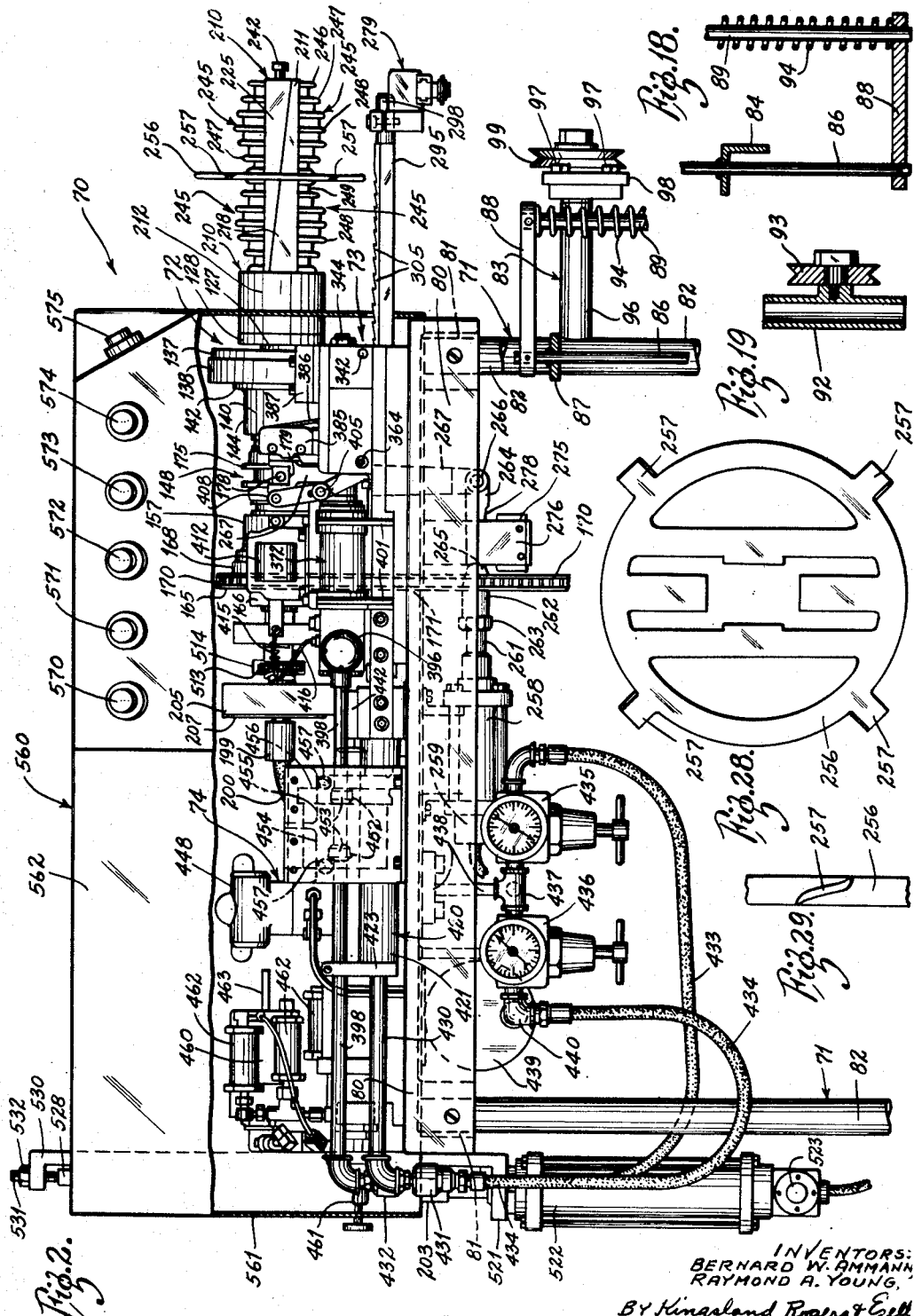
INVENTORS:
BERNARD W. AMMANN
RAYMOND A. YOUNG,
BY Kingsland, Rogers & Ezell
ATTORNEYS.

Dec. 28, 1954  B. W. AMMANN ET AL  2,698,033
COIL WINDING MACHINE
Filed Nov. 8, 1952  9 Sheets-Sheet 3
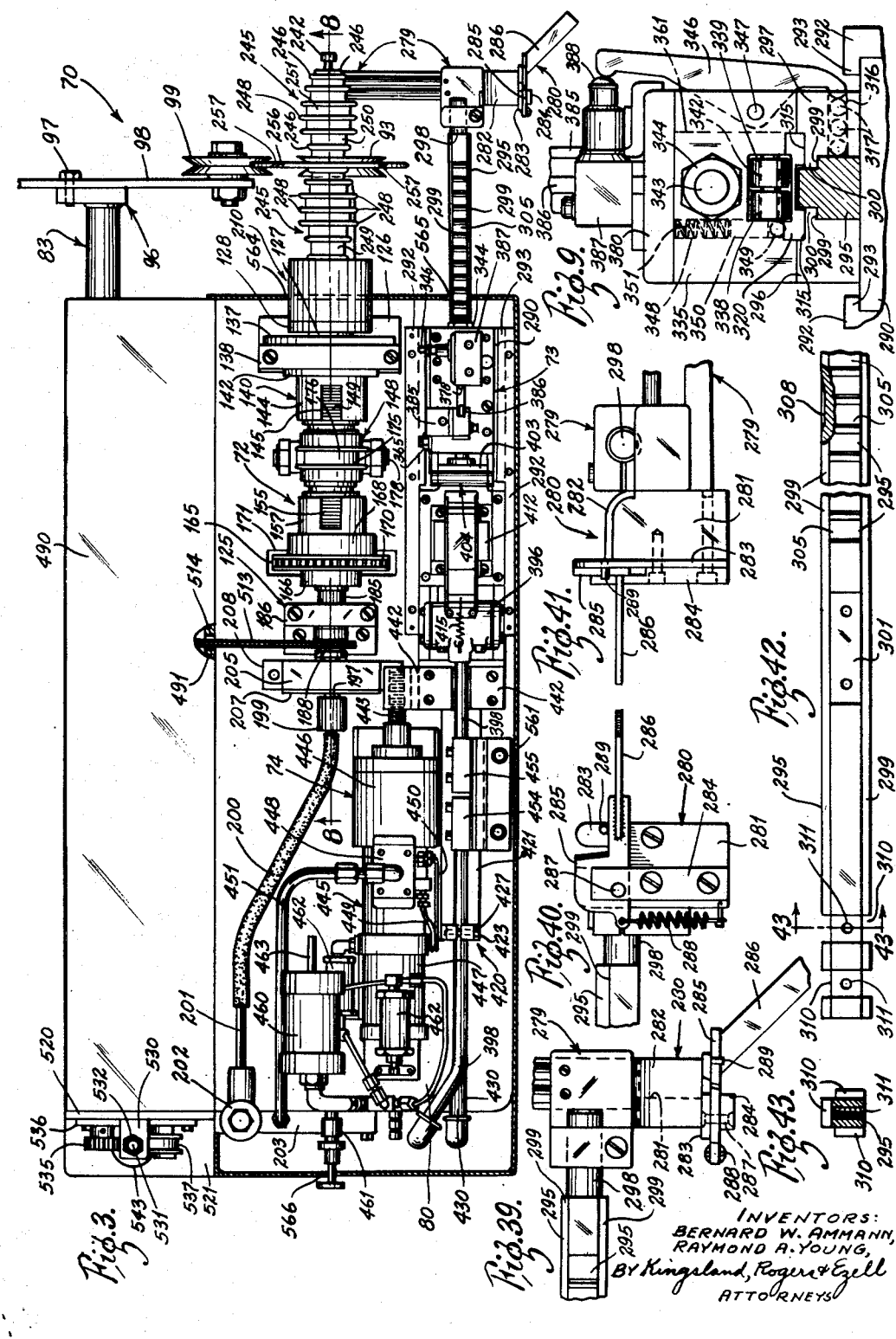
INVENTORS:
BERNARD W. AMMANN,
RAYMOND A. YOUNG,
By Kingsland, Rogers & Ezell
ATTORNEYS

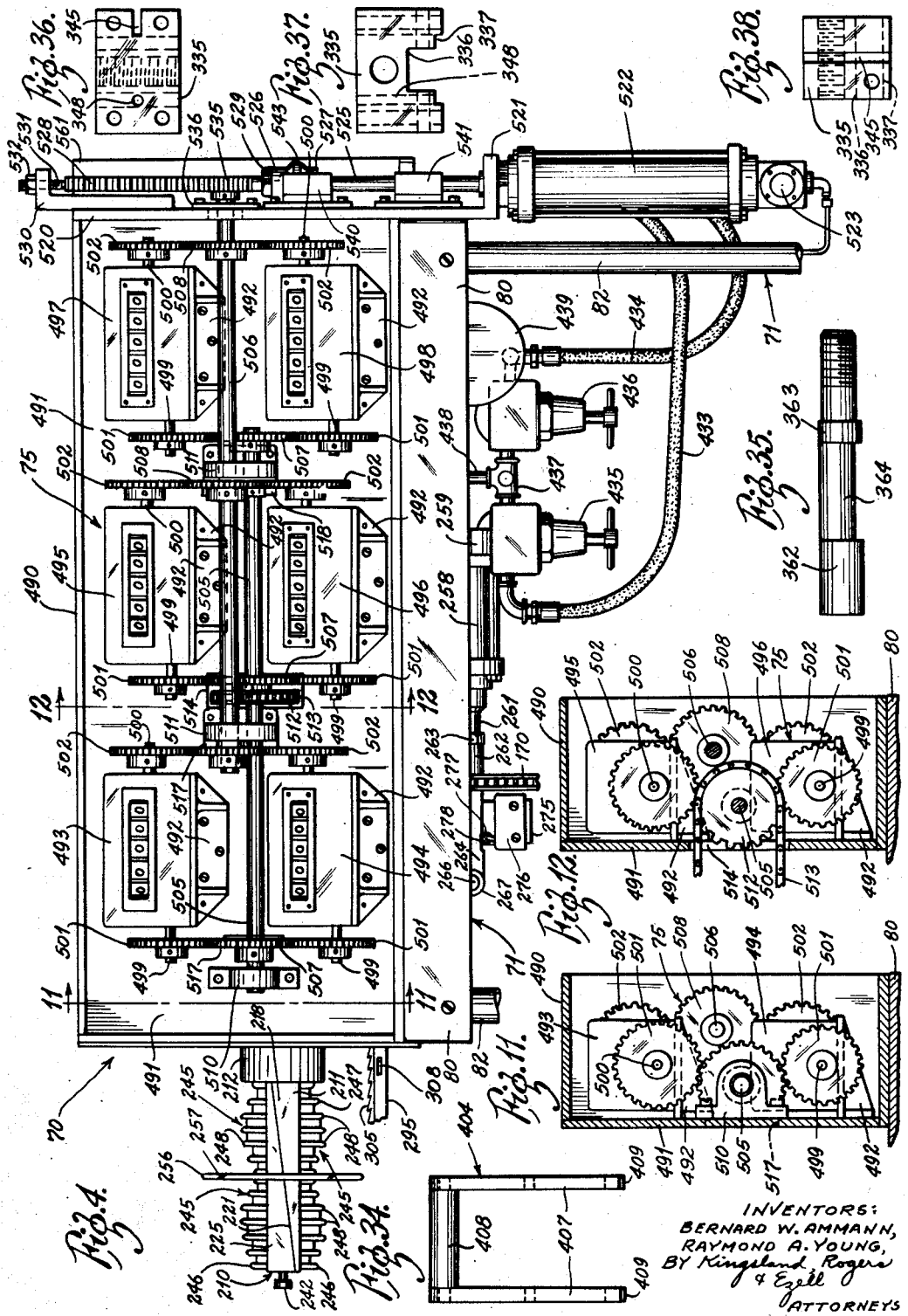

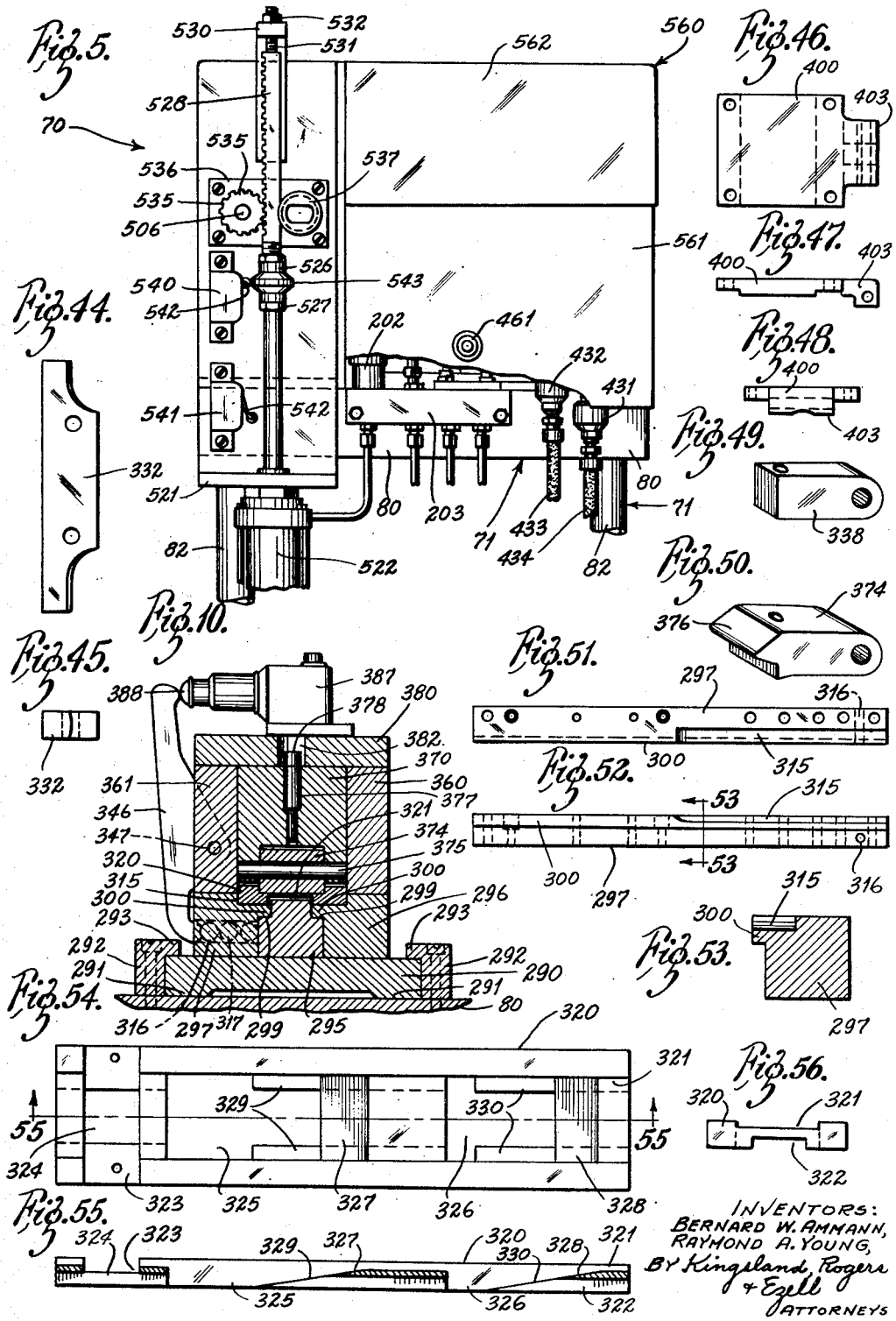

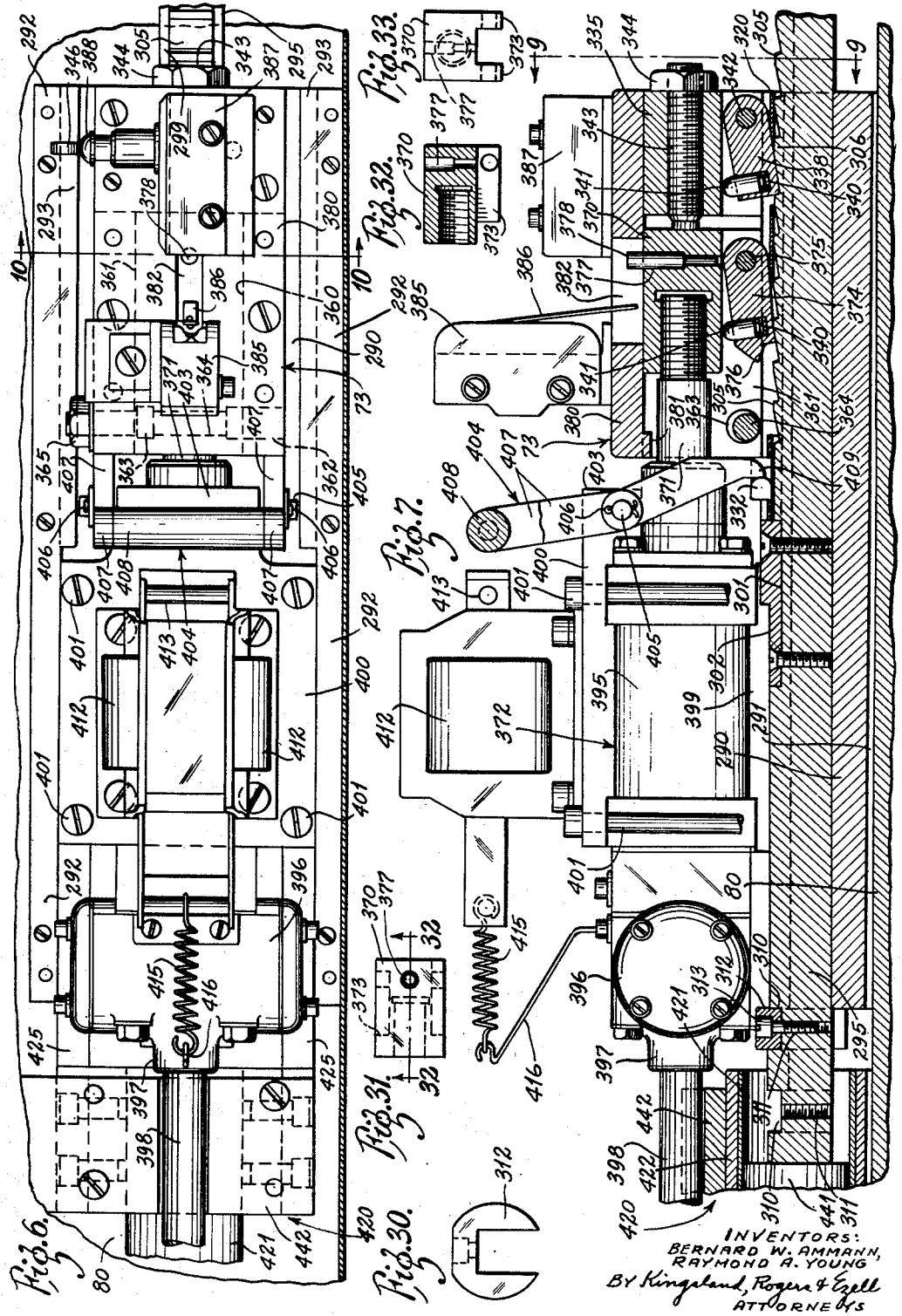

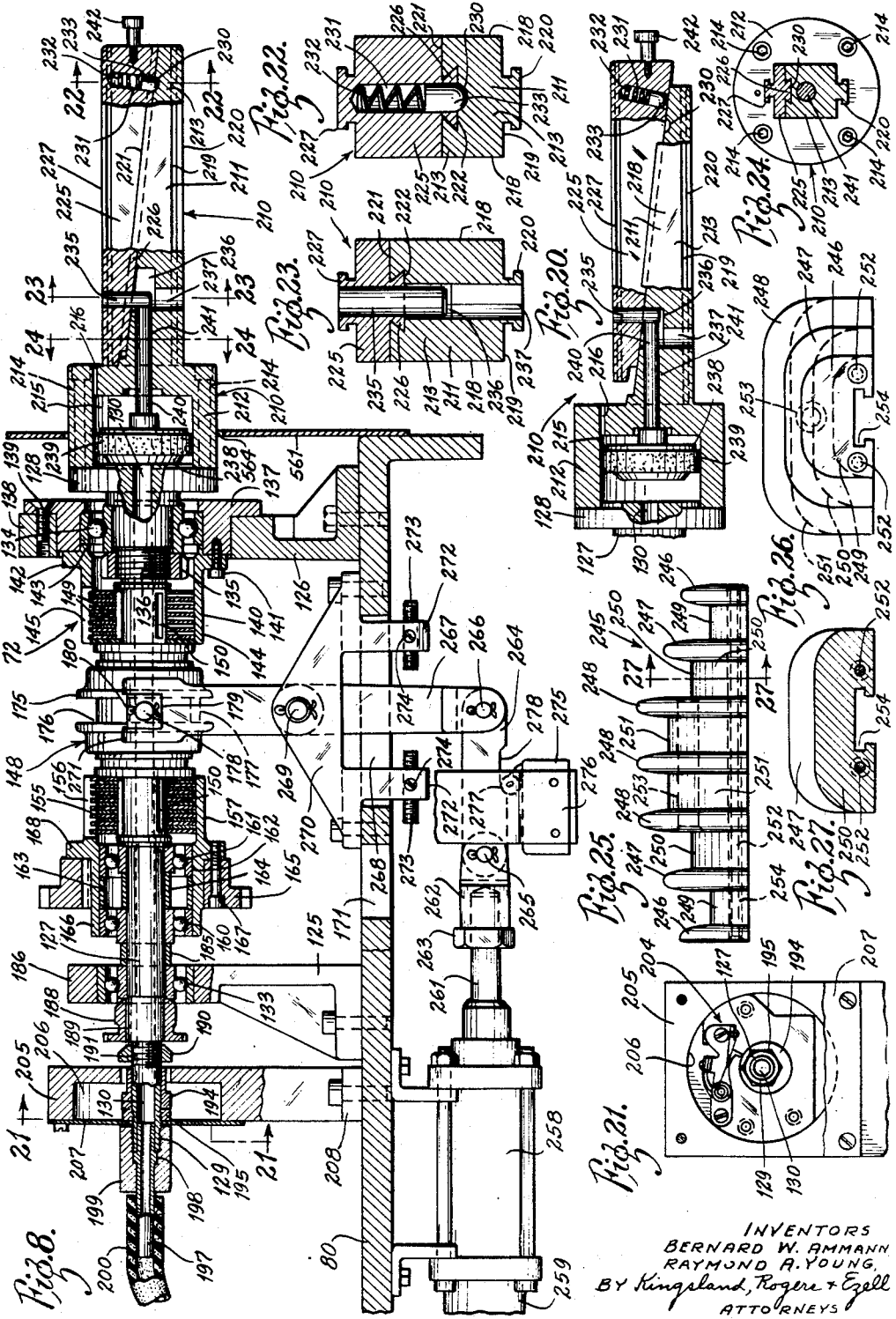

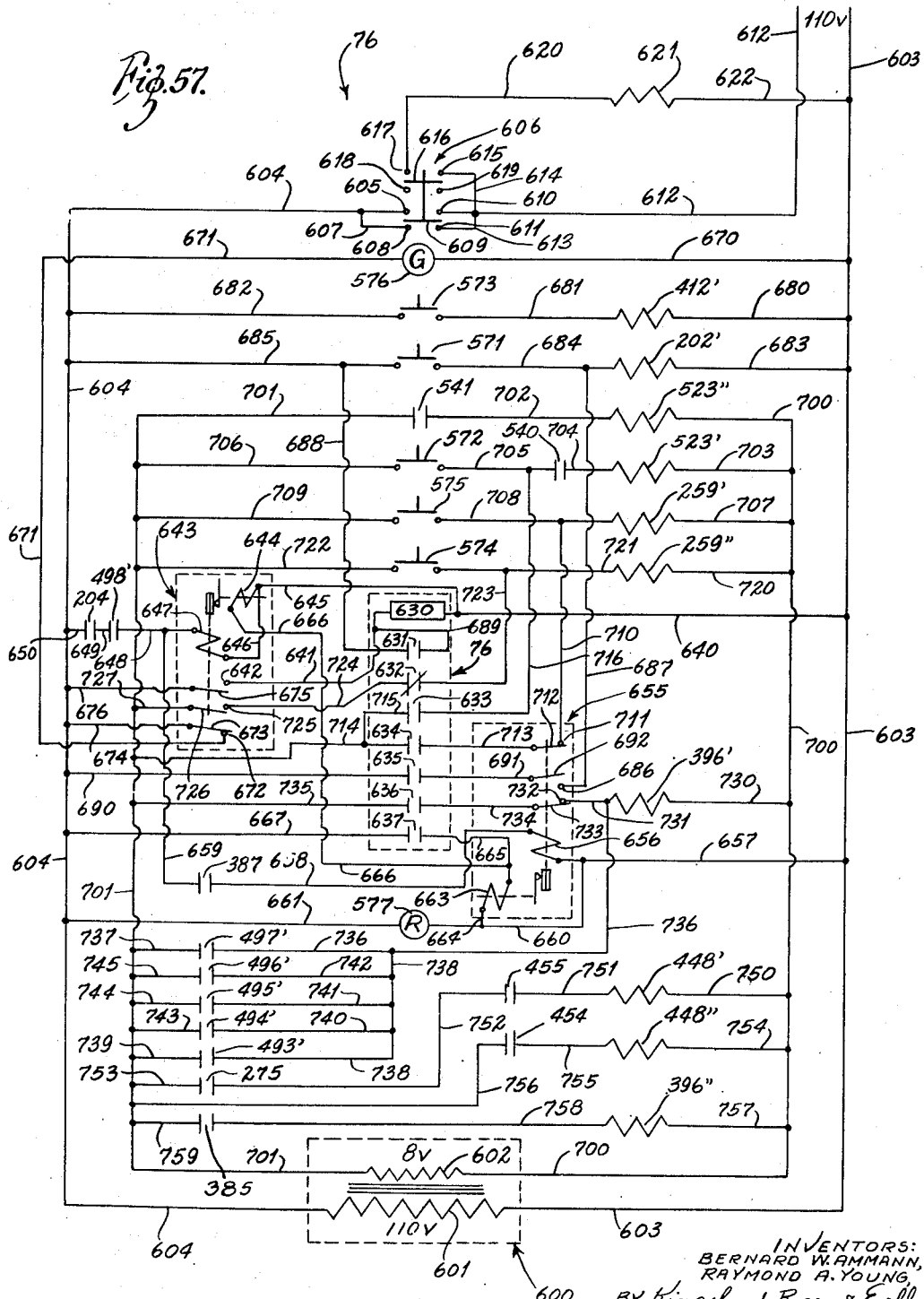

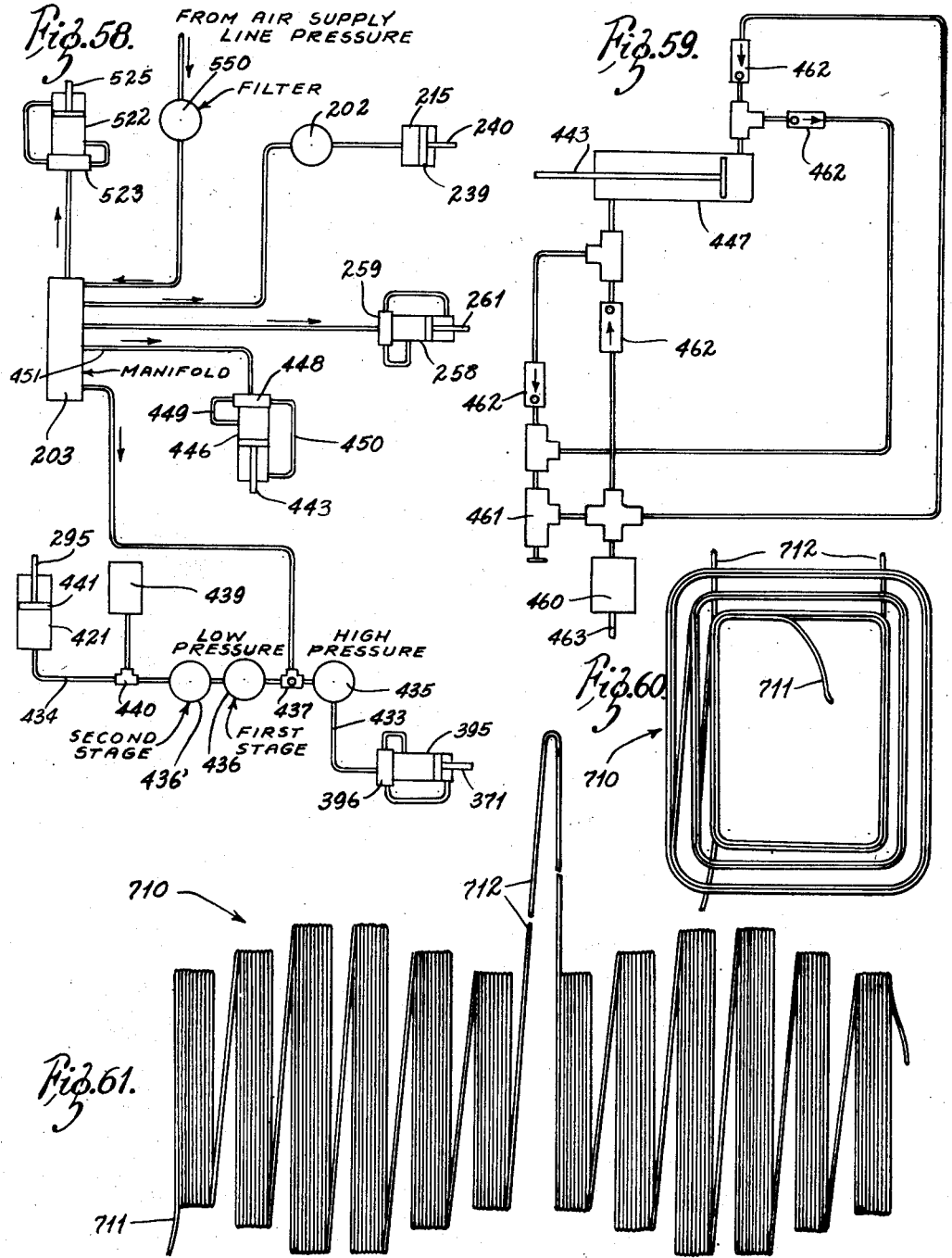

United States Patent Office 2,698,033
Patented Dec. 28, 1954

2,698,033

COIL WINDING MACHINE

Bernard W. Ammann, St. Louis, and Raymond A. Young, Normandy, Mo., assignors to The Emerson Electric Manufacturing Company, St. Louis, Mo., a corporation of Missouri Application November 8, 1952, Serial No. 319,536

11 Claims. (Cl. 140—92.2)

The present invention relates generally to winding mechanisms, and more particularly to an automatic coil winding machine for automatically winding coils of any number of steps and of any number of windings per step within the predetermined capacity of the machine.

Therefore, an object of the present invention is to provide an automatic coil winding machine for winding coils of any number of steps and of any number of turns per step within the predetermined capacity of the machine, and in which the selection of number of steps and turns may be accomplished quickly and efficiently.

Another object is to provide a novel automatic coil winding machine which is adapted to wind as many as four complete stepped coils from a single length of wire without intermediate attention from an operator.

Another object is to provide a novel automatic coil winding machine which is adapted to wind a plurality of complete stepped coils from a single length of wire and to provide a predetermined extra length of wire between selected adjacent coils.

Another object is to provide a novel automatic coil winding machine which incorporates a plurality of counters which may be individually set to determine the number of turns of wire in different steps of a coil, which incorporates mechanism for automatically resetting the several counters to zero upon the completion of their respective functions, and also incorporates manually actuated counter reset construction.

Another object is to provide a novel automatic coil winding machine which, upon the completion of a predetermined number of coils, automatically returns all movable parts to the starting position.

Another object is to provide a novel automatic coil winding machine which incorporates a periodically operable timing mechanism for controlling predetermined sequential operations at predetermined points in the winding of a plurality of stepped coils.

Another object is to provide a novel automatic coil winding machine which reduces to a minimum the amount of time required for reset operations when a coil of a different number of steps or a different number of turns is desired.

Another object is to provide a novel automatic coil winding machine incorporating novel construction for effecting jumps of the wire guides between steps of a coil.

Another object is to provide a novel automatic coil winding machine which includes novel construction for stopping the rotating spindle with its wound coil in substantially the same position at the conclusion of each winding cycle.

Another object is to provide a novel automatic coil winding machine incorporating manual, as well as automatic, reset construction for stopping the spindle, resetting the counters, and returning the operating parts to starting position.

Another object is to provide a novel unitary coil winding machine which incorporates a novel tensioning device.

Another object is to provide a novel unitary coil winding machine which incorporates a wire cutting assembly.

Other objects are to provide a novel automatic coil winding machine which is efficient in its winding cycle, which reduces to a minimum the amount of time required to reset the construction for predetermining the number of steps and the number of turns in each step of the coil, which is automatic except for the removal of the finished coil from the winding jig and engagement of the wire end with the empty jig, which is adapted to operate at a relatively fast speed, which may be set up in multiples for attendance by a single operator, which is compact in construction thereby reducing to a minimum the amount of space occupied by the machine, which is rugged and sturdy in construction thereby insuring long periods of operation with minimum maintenance, which is relatively inexpensive to construct, and which reduces the over-all cost per coil produced.

The foregoing and other objects and advantages are apparent from the following description taken with the accompanying drawings, in which:

Fig. 1 is an end elevation of an automatic coil winding machine constructed in accordance with the teachings of the present invention, a strip of magnet wire being shown in dotted lines, certain parts in the background being eliminated for the sake of clarity (Sheet No. 1);

Fig. 2 is a fragmentary front elevation thereof, partly in section, a portion of the front cover being broken away to reveal the control mechanism, certain parts being eliminated for the sake of clarity (Sheet No. 2);

Fig. 3 is a plan view thereof, portions of the cover being broken away and shown in section to reveal three major operating assemblies, viz., a spindle assembly, a jump mechanism, and a reciprocating mechanism (Sheet No. 3);

Fig. 4 is a fragmentary rear elevation thereof, the rear cover plate being removed to reveal a counting assembly (Sheet No. 4);

Fig. 5 is a fragmentary end elevation thereof, the view being taken from the end opposite that shown in Fig. 1, a portion of an end cover plate being broken away to reveal the details of air piping arrangement (Sheet No. 5);

Fig. 6 is an enlarged fragmentary plan view showing the jump mechanism of Fig. 3 in enlarged detail (Sheet No. 6);

Fig. 7 is an elevational view, partly in section, of the jump mechanism shown in Fig. 6 (Sheet No. 6);

Fig. 8 is an enlarged fragmentary vertical section through the spindle assembly, the view being taken generally along the line 8—8 of Fig. 3, a coil winding form and certain chains shown in the latter figure being omitted for clarity of detail (Sheet No. 7);

Fig. 9 is a fragmentary vertical section taken generally along the line 9—9 of Fig. 7 (Sheet No. 3);

Fig. 10 is a fragmentary vertical section taken generally along the line 10—10 of Fig. 6 (Sheet No. 5);

Fig. 11 is a fragmentary vertical section taken generally along the line 11—11 of Fig. 4 (Sheet No. 4);

Fig. 12 is a fragmentary vertical section taken generally along the line 12—12 of Fig. 4 (Sheet No. 4);

Fig. 13 is a fragmentary horizontal section taken generally along the line 13—13 of Fig. 1 (Sheet No. 1);

Fig. 14 is an enlarged horizontal section taken generally along the line 14—14 of Fig. 1 (Sheet No. 1);

Fig. 15 is a fragmentary vertical section taken generally along the line 15—15 of Fig. 14 (Sheet No. 1);

Fig. 16 is a fragmentary vertical section taken generally along the line 16—16 of Fig. 14 (Sheet No. 1);

Fig. 17 is a fragmentary vertical section taken generally along the line 17—17 of Fig. 15 (Sheet No. 1);

Fig. 18 is a fragmentary vertical section taken generally along the line 18—18 of Fig. 1 (Sheet No. 2);

Fig. 19 is a vertical section taken generally along the vertical centerline of a magnet wire tensioning sheave assembly shown in Fig. 1 (Sheet No. 2);

Fig. 20 is a fragmentary vertical section similar to the right-hand portion of Fig. 8, but showing an expendable arbor in retracted condition, rather than in the expanded condition of Fig. 8 (Sheet No. 7);

Fig. 21 is a fragmentary vertical section taken generally along the line 21—21 of Fig. 8 (Sheet No. 7);

Fig. 22 is a fragmentary vertical section taken generally along the line 22—22 of Fig. 8 (Sheet No. 7);

Fig. 23 is a fragmentary vertical section taken generally along the line 23—23 of Fig. 8 (Sheet No. 7);

Fig. 24 is a fragmentary vertical section taken generally along the line 24—24 of Fig. 8 (Sheet No. 7);

Fig. 25 is a side elevation of a removed winding jig section (Sheet No. 7);

Fig. 26 is an end elevation thereof (Sheet No. 7);

Fig. 27 is a vertical section taken generally along the line 27—27 of Fig. 25 (Sheet No. 7);

Fig. 28 is an elevational view of a removed cross-over plate (Sheet No. 2);

Fig. 29 is an enlarged fragmentary view showing a peripheral edge portion of the cross-over plate of Fig. 28, the view being taken radially inwardly from a point in line with any one of the four peripheral projections shown in Fig. 28 (Sheet No. 2);

Fig. 30 is an elevational view of a removed C-washer (Sheet No. 6);

Fig. 31 is a plan view of a removed reciprocating pawl block (Sheet No. 6);

Fig. 32 is a vertical section taken generally along the line 32—32 of Fig. 31 (Sheet No. 6);

Fig. 33 is an end elevation of the reciprocating pawl block of Fig. 31 (Sheet No. 6);

Fig. 34 is an elevational view of a removed tripper (Sheet No. 4);

Fig. 35 is an elevational view of a removed cam shaft (Sheet No. 4);

Fig. 36 is a plan view of a removed stationary pawl block (Sheet No. 4);

Fig. 37 is an end elevation thereof (Sheet No. 4);

Fig. 38 is a side elevation thereof (Sheet No. 4);

Fig. 39 is an enlarged fragmentary plan view of a wire cutting assembly shown at the extreme lower right portion of Fig. 3 (Sheet No. 3);

Fig. 40 is an elevational view taken from below Fig. 39 (Sheet No. 3);

Fig. 41 is an elevational view taken from the right-hand side of Fig. 40 (Sheet No. 3);

Fig. 42 is a fragmentary plan view of a removed jump rack (Sheet No. 3);

Fig. 43 is a vertical section taken generally along the line 43—43 of Fig. 42 (Sheet No. 3);

Fig. 44 is a plan view of a removed relief bar (Sheet No. 5);

Fig. 45 is an end elevation thereof (Sheet No. 5);

Fig. 46 is a plan view of a removed bracket plate (Sheet No. 5);

Fig. 47 is a side elevation thereof (Sheet No. 5);

Fig. 48 is an end elevation thereof (Sheet No. 5);

Fig. 49 is an isometric view of a removed stationary pawl (Sheet No. 5);

Fig. 50 is an isometric view of a removed reciprocating pawl (Sheet No. 5);

Fig. 51 is a plan view of a removed jump rack gib (Sheet No. 5);

Fig. 52 is a side elevation thereof (Sheet No. 5);

Fig. 53 is a vertical section taken generally along the line 53—53 of Fig. 52 (Sheet No. 5);

Fig. 54 is a plan view of a removed stripper (Sheet No. 5);

Fig. 55 is a vertical section taken generally along the line 55—55 of Fig. 54 (Sheet No. 5);

Fig. 56 is an end elevation of the removed stripper of Fig. 54 (Sheet No. 5);

Fig. 57 is a schematic diagram of the electrical system of the machine of the present invention (Sheet No. 8);

Fig. 58 is a schematic diagram of the compressed air system of the machine of the present invention (Sheet No. 9);

Fig. 59 is a schematic diagram of the hydraulic pressure system of the machine of the present invention (Sheet No. 9);

Fig. 60 is an end elevation of a magnet coil wound on the machine of the present invention (Sheet No. 9); and Fig. 61 is a side elevation thereof (Sheet No. 9).

Referring to the drawings more particularly by reference numerals, 70 indicates generally an automatic coil winding machine constructed in accordance with the principles of the present invention. Broadly, the machine 70 comprises a supporting base 71 (Figs. 1, 2, 4, 5, and 13), a spindle assembly 72 (Figs. 2, 3, 5, and 8), a jump mechanism 73 (Figs. 2, 3, 6, and 7), a reciprocating mechanism 74 (Figs. 2 and 3), a counting mechanism 75 (Figs. 4, 11, and 12), an intermittently operable timing mechanism 76 (shown schematically in Fig. 57), a prime mover 77 (Fig. 1), and connecting and interrelating elements, both mechanical and electrical, through which the several assemblies, constructions, and devices are cooperatively interconnected and actuated.

*The base and appurtenant devices*

Referring in greater detail to the several parts making up the present machine 70, the supporting base 71 comprises a table 80 which is preferably of cast construction, appropriately ribbed to provide structural strength, and which has a flat upper surface. The table 80 has four sockets 81 in which are received upright tubular members 82 forming part of a stand 83. The stand 83 is of welded construction and has reinforcing angular members 84 which serve to provide rigidity and also to support the prime mover 77 (Fig. 1) on appropriate rails (not shown). At the bottom of each upright tubular member 82, there is a flange 85 adapted to be secured to the floor or other surface on which the machine 70 may rest.

In addition to supporting the table 80 and the principal operating assemblies mounted thereon, the frame 83 supports means for appropriately guiding and tensioning the wire which is to be wound into coils. As best shown in Figs. 1, 2, and 18, one part of this tensioning means includes a vertical rod 86 rigidly mounted at one end of the frame 83, being welded to one of the end angle members 84 and also to a horizontal strap member 87 extending between the two particular upright tubular members 82. At both the upper and lower end of the vertical rod 86, there is mounted a horizontally extending bar 88 between the respective free ends of which is supported a second vertical rod 89. It is to be noted that the lower end of the rod 86 extends substantially below the angle member 84 to which it is secured, and, further, that the bars 88 are slidable both on the rod 86 and on the rod 89, being secured by means of appropriate setscrews. This arrangement provides for appropriate adjustment of the distance separating the two bars 88.

A tubular slide 92 (Fig. 19) carrying a rotatable sheave 93 is slidably disposed on the vertical rod, being centrally supported thereon between upper and lower compression springs 94. Clearly, the compression of the springs 94 may be adjusted by movement of the bars 88 as aforementioned.

Another part of the wire guide and tensioning means is supported from an appropriate one of the upright tubular members 82 by means of a bracket assembly 96 welded to the particular upright member 82 and thus forming a part of the frame 83. To the free end of the bracket assembly 96, there is removably secured, as by bolts 97, a plate member 98 on which are mounted two freely rotatable sheaves 99 and 100. It will be noted that the sheave 100 is mounted inwardly from one end of the plate member 98 to permit the magnet wire, which normally passes thereover as shown in Fig. 1, to pass vertically through a tensioning device 105 which is also mounted on the plate 98. This tensioning device 105, the details of which are clearly shown in Figs. 13 through 17, includes a block 106 secured by bolts 107 to a lower edge of the plate 98. The block 106 has two parallel holes bored horizontally therethrough, being thereby adapted to support a bar assembly comprising a bar 108 in which are secured parallel tension rods 109, the latter passing slidably through the holes in the block 106. The tension rods 109 extend substantially beyond the block 106 and, as clearly shown in Fig. 14, are yoked together by means of a tension bar 110. Suitable washers 111 and cotter pins 112 are provided for retaining the tension bar 110 on the rods 109. An adjusting stud 115 is firmly secured in the block 106 and extends in parallel with the tension rods 109. Although it is threaded, it will be noted that the stud 115 passes freely through a hole in the tension bar 110. An adjusting nut 116 threadedly engages the stud 115 and serves to adjust the compression in a spring 117 interposed between the nut 116 and the tension bar 110. It is thus seen that the bar 108 is adjustably biased toward the block 106 and is adapted, in the absence of an interposing element, to abut the block 106. The abutting faces of the block 106 and the bar 108 are each provided with an insert 118 which may be of Kennametal or similar wear-resisting material. Adjacent one end of each of the inserts 118, the block 106 and the bar 108 are cooperatively bored to form a threading hole 119. On the underneath surface of the block 106, there is secured a wire guide 120 formed as clearly shown in Figs. 16 and 17 to provide a guide hole 121 in vertical alignment with the opposed faces of the insert 118.

The spindle assembly

The spindle assembly 72 is mounted on the upper surface of the table 80, receiving its primary support from pillow blocks 125 and 126. The assembly 72 includes an elongated spindle 127 which terminates at one end in a flange 128 and at the other in a threaded portion 129. As may best be seen in Fig. 8, the external configuration of the spindle 127 is generally cylindrical and is divided into steps of various lengths and diameters, the diameters increasing progressively by steps from that of the threaded portion 129 as they approach the flange 128, so that the several elements to be assembled on the spindle 127 may be properly disposed thereupon. Certain of the steps are threaded to receive nuts, as will appear. An axial bore 130 extends completely through the spindle 127.

The spindle 127 is supported for rotation by means of bearings 133 and 134. The bearing 134 is the first element to be assembled on the spindle 127 and is positioned near the flange 128, as clearly shown in Fig. 8. The inner race of the bearing 134 is retained in appropriate position on the spindle 127 by means of a bearing nut 135 threadedly engaging an adjacent threaded portion 136 of the spindle 127. The outer race of the bearing 134 is disposed in a bearing retainer 137 which is, in turn, mounted in the pillow block 126 and retained therein by a pillow block cap 138. The retainer 137 is secured against rotation in the pillow block 126 and the cap 138 by means of screws 139 securing these parts together. A brake cup 140, shaped as clearly shown in Fig. 8, is, in turn, secured to the retainer 137 by screws 141, the brake cup 140 having an annular flange 142 for this purpose. Additionally, the brake cup 140 has an axially extending annular portion 143 which abuts the outer race of the bearing 134 to secure the same in the retainer 137. Extending the other way from the flange 142, or to the left in Fig. 8, the brake cup 140 has a cup-like skirt portion 144 provided with a plurality of longitudinal slots 145. It is obvious that the arrangement is such as to maintain the brake cup 140 stationary at all times.

The stationary brake cup 140 is, therefore, adapted to operate as a non-rotatable braking element in cooperation with a double clutch assembly 148. This clutch assembly 148 comprises a set of friction plates 149, alternate ones of which have peripheral lugs engaging the slots 145 in the brake cup 140. The remaining plates 149 are adapted to turn with the spindle 127, for which purpose they have inner lugs which engage keys 150 retained in appropriate slots in the spindle 127. It is, of course, clear that axial compression between the several plates 149 will produce a frictional drag between those which are retained against rotation by the brake cup 140 and those which are adapted to rotate with the spindle 127. The frictional drag thus produced is effective to stop the rotation of the spindle within a fraction of a revolution.

In addition to that part of the double clutch 148 which has been described as performing a braking function, there is a similar arrangement for driving the spindle 127. Thus, there is another set of friction plates 155, alternate ones of the latter being also adapted to rotate with the spindle 127, while the remaining plates 155 engage slots 156 in a driving cup 157. The driving cup 157, unlike the brake cup 140, is mounted for rotation about the axis of the spindle 127. Moreover, by virtue of the controllable clutching action of the plates 155 to be hereinafter described, the driving cup 157 is adapted to rotate either with the spindle 127 or independently thereof. To this end, the driving cup 157 is mounted on the spindle 127 by means of bearings 160 and 161. The outer races of these bearings are press-fitted in an internal bore 162 of the driving cup 157 and are appropriately spaced by means of a spacer 163. The inner races of the bearings 160 and 161 are disposed on the spindle 127 with a spacer 164 interposed therebetween. A chain sprocket 165 is mounted on a skirt portion 166 of the driving cup 157 and is secured against rotation relative to the driving cup 157 by means of bolts 167 engaging a driving cup flange 168.

The chain sprocket 165 is in driven engagement with a drive chain 170 (Figs. 1 and 2) which passes through a slot 171 in the table 80 and which is, in turn, driven by the prime mover 77. The latter rotates continuously while the present machine 70 is in service, from which it is apparent that the consequent continuous rotation of the chain sprocket 165 is effective to drive the spindle 127 whenever the plates 155 of the clutch 148 are compressed.

On the other hand, when the plates 155 are not under compression, the sprocket 165, the driving cup 157, and the plates 155 engaging the driving cup 157 are enabled to rotate freely relative to the spindle 127.

A shifter element 175 is interposed between the two sets of plates 149 and 155. The shifter element 175 is rotatably mounted on the spindle 127 and is free to slide axially thereupon so as to compress either of the two sets of friction plates 145 and 156. This shifter element 175 has an annular groove 176 located centrally of its axial length and adapted slidably to receive a semicircularly formed shifter 177 having oppositely extending pivots or trunnions 178. The bight portion of the semicircular shifter 177 passes under the shifter element 175 and each pivot 178 receives a shifter block 179 which is pivotally retained thereon by means of a cotter pin 180.

The bearing 133 which supports the left-hand end of the spindle assembly 72 has its inner race disposed on the spindle 127 an appropriate axial distance from the bearing 160, a spacer 185 being interposed between these two bearings. The outer race of the bearing 133 is mounted in the pillow block 125 and secured therein by a pillow block cap 186. A chain sprocket 188 is disposed on the spindle 127 in abutment with the inner race of the bearing 133 and is secured for rotation with the spindle 127 by means of a key 189. A nut 190 threadedly engaging a threaded portion 191 of the spindle 127 retains not only the chain sprocket 188, but also the inner races of each of the bearings 133, 160 and 161, along with the spacers 164 and 185, against axial movement relative to the spindle 127.

To the left of the nut 190, a cam 194 is disposed on the spindle 127 and secured for rotation therewith by means of a nut 195. The nut 195 threadedly engages the threaded portion 129.

A hollow stud 197 having an intermediate external shoulder 198 has one of its ends inserted in the end of the bore 130 formed in the spindle 127, and is retained by a connector 199 which also threadedly engages the threaded portion 129. The stud 197 is preferably of bronze or similar material, and its external dimensions are such relative to the internal dimensions of both the bore 130 and the connector 199 that this hollow stud 197 may be held stationary while the spindle 127 and the connector 199 rotate freely about it. The free end of the stud 197 is slip-connected to one end of a flexible tube 200, the frictional engagement of these parts being sufficient both to maintain the joint and to hold the stud from rotation with the spindle 127.

As best shown in Fig. 3, the other end of the flexible tube 200 is connected by means of an appropriate nipple 201 to a solenoid operated air valve 202. The solenoid valve 202 is mounted upon, and has an air connection with, a compressed air manifold 203, appropriately mounted at one end of the table 80 (Fig. 5). The valve 202 is of a conventional type which, upon energization, opens to permit a flow of air therethrough and which, upon deenergization, closes off the flow of air and vents the outlet side of the valve.

The cam 194 is adapted to cooperate with a breaker assembly 204 (Fig. 21). The assembly 204 may be of conventional type, such as that used in the ignition systems of automobiles. A housing 205 of masonite or other suitable non-conductive material is provided to accommodate the breaker assembly 204 as clearly shown in Figs. 8 and 21. The housing 205 has a recess 206 provided with a removable cover 207 for enclosing both the cam 194 and the breaker assembly 204. The housing 205 is appropriately secured to a base plate 208 which is, in turn, secured to the upper surface of the table 80.

Considering now the flanged end of the spindle 127, it will be noted (Figs. 8 and 20) that the flange 128 supports an arbor assembly 210 for rotation therewith. The arbor assembly 210 includes an arbor 211 comprising a cup-like portion 212 and an extension 213. The open end of the cup-like portion 212 abuts the aforementioned flange 128 and the arbor is secured in this position by means of bolts 214. There is thus provided a substantially closed air cylinder 215 in communication with the bore 130 of the spindle 127. Additionally, a bleed hole 216 is provided in the cup-like portion opposite the open end thereof.

The extension 213 of the arbor 210 is shaped as clearly shown in Figs. 8, 20, and 22 through 24. It will be noted that the extension 213 has parallel side surfaces 218 and a horizontal lower surface 219, the latter provided with a longitudinally extending inverted T-rail 220. The upper surface 221 of the extension 213 is formed with a longitudinal slope and is provided with a longitudinally extending dove-tail groove 222. A slide 225, shaped as clearly shown in the drawings to be complementary with the extension 213, slidably engages the latter and is provided with a dove-tail longitudinal rail 226 for retention in the groove 222. The upper surface of the slide 225 is provided with a longitudinally extending T-rail 227. It will be noted that longitudinal movement of the slide 225 relative to the extension 213 provides a maximum vertical separation of the T-rails 220 and 227 when the slide 225 is moved to closed position, as illustrated in Fig. 8. Fig. 20 illustrates the slide 225 in its open position relative to the extension 213, in which position the vertical separation of the T-rails 220 and 227 is substantially reduced in comparison to that in the closed position.

For retaining the slide 225 in closed position, there is provided a detent means comprising an indentation 230 in the upper surface of the extension 213. For cooperation with this indentation 230, the slide 225 has a well 231 in which are disposed a compression spring 232 and a pin 233, the latter being adapted to engage the indentation 230 upon closure of the slide 225. The extent of opening movement of the slide 225 is limited by means of a stud 235 secured therein, as by pressing, and depending below the inclined lower surface of the slide 225. A recess 236 is formed in the extension 213 to accommodate this pin 235 and is of an appropriate size, as illustrated, to permit desired movement of the slide 225. A hole 237 is formed in vertical extension to the recess 236 to provide access to the pin 235 for insertion or removal thereof.

The opening movement of the slide 225 is automatically achieved as will appear hereinafter, and, to this end, there is provided a piston assembly 238 slidably disposed in the arbor 210. The assembly 238 includes a piston 239 disposed within the cylinder 215 and connected to a piston rod 240 which extends through a longitudinal bore 241 in the arbor 210. The bore 241 communicates with the recess 236 and enables the piston rod 240 to abut the depending pin 235 of the slide 225. The slide 225 may also be opened or closed manually, for which purpose there is provided an appropriate button 242 at the free end of the slide 225.

Coils wound on the present machine 70 are preferably wound about coil forms of the general type illustrated in Figs. 25 through 27. In these figures, there is illustrated a coil form 245 comprising appropriately sized and shaped plates 246, 247, and 248 separated by appropriately sized and shaped spacers 249, 250, and 251, these several elements being joined and firmly secured by means of longitudinal bolts 252 and 253. Each of these plates and spacers is provided with a longitudinally extending T-shaped recess, as at 254, which enables the assembly to be slidably disposed upon, and to be retained on, either of the T-rails 220 or 227 aforementioned. It will be understood that coil forms of the general type illustrated are assembled on the arbor assembly in pairs so that, when the slide 225 is in closed position, one coil form of each pair will be opposite another. The present machine 70 is adapted to accommodate two pairs of coil forms 245, the pairs being, of course, disposed in axial extension along the arbor extension 213 and the slide 225.

In the presently illustrated embodiment of this invention, it is assumed that it will be desirable to provide an extra length of magnet wire between the several coils wound on the two pairs of coil forms 245. To this end, a cross-over plate 256 (Figs. 28 and 29) is provided. This cross-over plate 256 is preferably shaped as clearly shown in Fig. 28 and is adapted to be disposed on the arbor extension 213 and the slide 225 so as to be interposed between the two pairs of coil forms 245. The cross-over plate 256 is provided with a plurality of peripheral projections 257, preferably bent as clearly shown in Fig. 29, these projections 257 being adapted to pick up a loop of magnet wire, as will appear.

It has already been mentioned that rotation of the spindle 127 is effected by moving the shiftable element 175 so as to compress the clutch plates 155 and that the spindle 127 may be stopped from rotating by shifting the shiftable element 175 so as to compress the clutch plate 149. These movements of the shiftable element 175 are automatically effected as will appear, the power for the shift being derived from a conventional double-acting air cylinder 258 (Fig. 8) mounted beneath the table 80 by means of appropriate brackets and bolts, as illustrated. This air cylinder 258 is provided with a two-way magnetic valve 259 which is connected by means of appropriate piping to the air manifold 203. As is best shown in Fig. 8, the air cylinder 258 has a horizontally extending reciprocable piston rod 261 which threadedly engages a clevis 262, the latter being retained in adjusted position by means of a jam nut 263. A connecting link 264 has a pivotal connection 265 with the clevis 262 and extends in substantial horizontal prolongation of the latter for pivotal connection 266 with the lower end of a fork member 267. The fork member 267 extends upwardly from the link 264, passing through an opening 268 in the table 80, and is pivotally mounted at a point intermediate its vertical length by means of a pivot pin 269 supported in a fork holder 270 secured to the upper surface of the table 80. The upper end of the fork member 267 is bifurcated so as to straddle the shiftable element 175 and each branch of this bifurcated end is itself bifurcated, as at 271, so as slidably to engage the respective shifter blocks 179. It is apparent from Fig. 8 that reciprocation of the piston rod 261 of the air cylinder 260 will cause the shiftable element 175 alternately to compress the clutch plates 156 and 149. Preferably, the fork holder 270 has two depending lugs 272 which extend downwardly through the opening 268 and are provided with adjusting studs 273 and setscrews 274 for limiting the maximum movement of the fork 267.

It may be mentioned here that certain automatic movements of the present machine 70 are under electrical control and that certain electrical elements are mounted at various positions so as to be actuated by moving elements of the machine 70. The above-mentioned circuit breaker 204 actuated by the cam 194 is one example of this automatic electrical control. Another example is a reciprocator cut-off switch 275 (Fig. 8) mounted on a bracket 276 secured to the underneath side of the table 80. The switch 275 is of the normally open type and has an actuating arm 277 in contact with the lower edge of the connecting link 264. This lower edge of the link 264 is relieved, as at 278, so that, when the double clutch assembly 148 is in driving position, the switch 275 will be in closed condition, and, when the clutch assembly 148 is in braking position, the switch 275 will be in open condition. The significance of this automatic actuation of the switch 275 will appear hereinafter.

A wire guide and support assembly 279 is provided for guiding the magnet wire over the different portions of the coil forms 245. This assembly 279 may be similar to the wire guide and support assembly described in detail in a copending application, Serial No. 325,676, filed Dec. 12, 1952, in the name of Bernard W. Ammann, substituted for application, now abandoned, Serial No. 66,379, filed December 20, 1948, in the name of Bernard W. Ammann. The present embodiment, however, includes a wire cutting assembly 280 secured to the wire guide and support assembly 279 as clearly shown in Figs. 39, 40, and 41. As may be seen from these figures, the wire cutting assembly 280 includes a block 281 overlain by a guard plate 282, the latter being preferably bent as shown, and secured, as by welding, to the block 281. A notched blade plate 283 is disposed against a vertical end surface of the block 281 and is secured thereto by means of a clamp strip 284 and suitable screws. A movable blade 285, preferably shaped as clearly shown in Fig. 40 and provided with a suitable handle 286, is mounted on a pivot pin 287 so as to be flush against the side of the plate 283, the clamp strip 284 being cut away as best shown in Fig. 41 to accommodate the blade 285 for appropriate shearing cooperation with the notched plate 283. The movable blade 285 is biased to a normally open position by means of a tension spring 288. A pin 289 secured in the stationary plate 283 establishes the open position of the blade 285. As is apparent from the drawings, a downward pressure on the handle 286 is effective to shear a magnet wire placed between the blades of the assembly 280.

*The jump mechanism*

The jump mechanism 73 (Figs. 2, 3, 6, and 7) includes a base 290 slidably disposed on the upper surface of the table 80 in spaced parallel relation to the spindle assembly 72. This base 290 preferably has lower bearing projections 291, as shown in Fig. 10, and is slidably retained by appropriate gibs 292 bolted to the table 80. The base 290 is rectangular in plan and the gibs 292 are preferably of approximately the same length as the longer dimension of the base 290. Overhanging portions 293 of the gibs 292 may, however, be of approximately only half the total length of these members, as shown in Fig. 6. An elongated jump rack 295 is slidably disposed on the top surface of the base 290 and is slidably retained thereon by means of gibs 296 and 297 bolted to the base 290.

The rack 295 is substantially longer than the base 290, but the gibs 296 and 297 may be of substantially equal length to the base 290. The forward or right-hand end (as illustrated) of the rack 295 has a short cylindrical portion 298 for attachment of the wire guide and support assembly 279 (Figs. 3 and 39) and the remainder of the rack 295 is formed as clearly shown in Figs. 42 and 43. Cross sections of the rack 295 appear in each of the Figs. 9 and 10, from which it may be seen that the cross-sectional shape is generally that of an inverted T, the cross bar of the T acting as a base and having shoulders 299 which cooperate with lips 300 formed on the gibs 296 and 297 to retain the rack 295 in proper position. Intermediate the ends of the rack 295, the stem portion is recessed, as at 301 (Fig. 42), to accommodate a stop 302 (Fig. 7), the latter being the same width as this stem portion of the rack 295 and secured thereto by appropriate bolts. The upper surface of the rack 295 between the cylindrical end portion 298 and the recess 301 has teeth 305 formed thereon as clearly illustrated in the drawings, and as particularly well shown in the cross-sectional view of Fig. 7. All of the teeth 305 are identical except for one tooth 306 which is slightly longer than the remaining teeth 305. In one embodiment of the present machine 70, the typical length of the teeth 305 is one-half inch, whereas the single tooth 306 is eleven-sixteenths of an inch in length. In the presently illustrated embodiment, it will be noted that the tooth 306 is the seventh tooth from the inner end of the toothed portion of the rack 295. Forwardly, or to the right (as illustrated) of the elongated tooth 306, one side of the base portion of the rack 295 is relieved as at 308 in Fig. 42. In the present embodiment, the depression 308 is approximately opposite the fifth tooth beyond the long tooth 306.

At the left-hand end of the rack 295, both the stem portion and the body portion are cut away as clearly shown in Figs. 42 and 43 to form slots 310, the remaining portion of the rack 295 in these areas being provided with threaded holes 311. Either of these slots 310 is adapted to receive a C-washer 312, shaped as clearly shown in Fig. 30 and secured to the rack 295 by means of a screw 313 as shown in Fig. 7.

A removed gib 297 is illustrated in Figs. 51, 52, and 53, from which it will be noted that the upper surface both of the lip portion 300 and a portion of the main body of the gib 297 extending inwardly thereof is recessed, as at 315, for approximately half the length of the gib 297. It will further be noted that the gib 297 has a transverse hole 316 extending therethrough adjacent one end thereof. As best shown in Figs. 9 and 10, this hole 316 is adapted to accommodate a plurality of balls 317. The gib 296 differs from the gib 297 only in that it is of opposite hand and in that it does not have a hole corresponding to the hole 316 in the gib 297.

A stripper 320, shaped as clearly shown in Figs. 54 through 56, is slidably disposed in the recesses 315 of the gibs 296 and 297 in the manner clearly illustrated in Figs. 9 and 10. Preferably, the stripper 320 is fabricated from a single rectangular plate. In this plate, there are formed an upper longitudinal channel 321 and an inverted lower longitudinal channel 322, the latter being of appropriate width to clear the toothed portion of the jump rack 295. Near one end, the stripper 320 has a transverse channel 323 formed to a depth which brings its lower surface even with the upper surface of the inverted channel 322, thereby leaving an opening 324 through the plate from which the stripper 320 is formed. Two additional openings 325 and 326 are formed in the plate to give it the illustrated shape of the stripper 320. The openings 325 and 326 have a maximum width equal to that of the upper channel 321, and it will be noted that the cuts for these openings are made in a manner to leave inclined surfaces 327 and 328 in the web remaining between the channels 321 and 322, these inclined surfaces being carried also down the side portions adjacent the lower channel 322, as indicated at 329 and 330. A release bar 332, shaped as clearly shown in Figs. 44 and 45, fits into the transverse channel 323 of the stripper 320 and is appropriately secured therein for a purpose to appear.

A stationary pawl block 335, shown removed in Figs. 36 through 38, is superimposed on the gibs 296 and 297 so as to span these members adjacent one end thereof. The pawl block 335 has an inverted channel 336 formed therein, this channel 336 being widened, as at 337, adjacent the lower surface of the block 335. This widened portion 337 provides clearance for the stripper 320, while the narrower portion 336 substantially equals the width of the channel 321 in the stripper 320. The channel 336 is adapted to accommodate a pair of pawls 338 and 339, each provided with a spring 340 and a slidable pin 341. The pawls 338 and 339 are pivotally retained side by side by means of a pivot pin 342. This arrangement is clearly shown in Figs. 7 and 9 wherein it will be noted that the pawls 338 and 339 are continuously biased by means of the springs 340 toward engagement with the toothed portion of the rack 295. It may be mentioned that the pawl 338 is slightly longer than the pawl 339, the difference in the specific embodiment aforementioned being three-sixteenths of an inch. Above the channel 336, the pawl block 335 is longitudinally threaded to receive a dog screw 343 which is retained in adjusted position by a jam nut 344.

A vertical slot 345 is formed in one side of the pawl block 335 and pivotally receives a lever 346 shaped as best shown in Figs. 9 and 10. The lever 346 is retained by a pin 347, and it will be noted that the lower end of this lever 346 is adapted to engage the outside ball 317 disposed, as aforementioned, in the gib 297. The pawl block 335 also has a vertical hole 348 which emerges at its lower end in the widened portion 337 of the channel 336. This hole 348 is adapted to receive a ball 349, a follower pin 350, and a biasing spring 351, as best shown in Fig. 9. Preferably, the upper surface of the stripper 320 is indented so as partially to receive the ball 349 when the stripper 320 is in its forward or right-hand position.

A pair of side plates 360 and 361 are superimposed on the gibs 296 and 297, respectively, so as to abut opposite sides of the stationary pawl block 335. Each of the side plates 360 and 361 is transversely drilled so as rotatably to receive a cam shaft 362, shown removed in Fig. 35. It will be noted that the two ends of the cam shaft 362 are of different diameters, hence, the holes in the respective plates 360 and 361 are correspondingly different. Otherwise, the plates 360 and 361 are identical. It will be noted that the end portions of the eccentric shaft 362 are concentric and that there is an intermediate concentric portion 363 equal in diameter to the larger end portion. Intermediate these portions of relatively large diameter, however, there is an eccentric portion 364 of somewhat smaller diameter. In assembled position, both the portion 363 and the inner end of the larger end portion extend inwardly of the plates 360 and 361 and cooperate to retain the stripper 320 in its proper position on the gibs 296 and 297. Rotation of the eccentric shaft 362 effects a positional adjustment of the eccentric portion 364 for a purpose to appear. The shaft 362 is maintained in adjusted position by means of a nut 365.

A reciprocating pawl block 370, shaped as clearly shown in Figs. 31 through 33, is disposed for longitudinal reciprocating movement between the guide plates 360 and 361. This pawl block 370 is supported on the threaded end of a piston rod 371 forming part of a cylinder assembly 372. It will be noted that the block 370 has depending flanges 373 adapted to receive a pawl 374 pivotally retained by a pivot pin 375. The pawl 374, like the pawls 338 and 339, is provided with a spring 340 and a slidable pin 341 by means of which it is continuously urged toward engagement with the toothed portion of the rack 295. Preferably, the pawl 374 has a nose end 376 shaped as shown in Fig. 50 and adapted to abut the eccentric portion 364 of the eccentric shaft 362. It may thus be seen that the reciprocable movement of the pawl 374 may be adjustably limited by appropriate adjustment of the eccentric shaft 362. It will be further noted that the dog screw 343 mounted in the pawl block 335 is adjustable to limit the travel of the pawl 374 in the other direction.

The pawl block 370 has a vertical countersunk hole 377 which receives a pin 378. The upper end of the pin 378 extends above the pawl block 370 for a purpose to appear.

A cover 380 is superimposed on the stationary pawl block 335, and on the side plates 360 and 361. This cover 380 is appropriately located and secured by dowels and bolts, the latter passing preferably down through the several superimposed elements and threadedly engaging the base 290. A depending lip portion 381 may be provided at one end of the cover 380 to act as a spacing element between the side plates 360 and 361. The cover 380 has a central elongated slot 382 formed therethrough as clearly shown in Figs. 6 and 7, and it will be noted that the aforementioned pin 378 extends into this slot 382 and is reciprocable therein.

Surmounting the cover 380 and secured thereto are two switches forming part of the electrical control system for the present machine 70. A jump return switch 385 has an actuating arm 386 which extends downwardly into the slot 382 so as to be engageable by the pin 378 as the latter reciprocates with the reciprocating pawl block 370. The switch 385 is of the normally open type and is closed upon engagement of its actuating arm 386 by the pin 378. A selector switch 387 having a horizontally extending push button 388 is mounted for actuation by the upper extension of the aforementioned lever 346. The switch 387 is also of the normally open type, but it will be apparent from the foregoing description that the only time it is permitted to open is when the jump rack 295 is in that position of its movement wherein the inner ball 317 is received in the depression 308.

The cylinder assembly 372 is a conventional unitary assembly and includes, besides the piston rod 371, a double-acting air cylinder 395 and a two-way magnetic valve 396 provided with an inlet 397 into which an appropriate supply pipe 398 is connected. This whole assembly 372 rests upon appropriate cradle plates 399, one each of which is secured to the respective gibs 296 and 297. The assembly 372 is retained by means of a plate 400, shown removed in Figs. 46 through 48, which is disposed over the top of the cylinder 395 and secured by appropriate bolts 401 which extend downwardly through the respective gibs 296 and 297 and threadedly engage the base 290.

The forward or right-hand end of the plate 400 has an extension 403 which overhangs the corresponding end of the cylinder 395 and supports a tripper 404 pivotally mounted to the plate 400 by means of a pivot pin 405 retained by cotter pins 406. As may be noted from Fig. 34, the tripper 404 is substantially U-shaped, comprising side bars 407 secured to a cylindrical cross-bar 408. The side bars 407 are preferably shaped as clearly shown in Fig. 7, from which view it will be noted that a lower portion 409 is adapted to engage the ends of the release bar 332. From Fig. 7, it may also be seen that clockwise rotation of the tripper 404 is effective to move the release bar 332 and, through the latter, the stripper 320 to the left. This movement of the stripper 320 is effective to pivot the pawls 338, 339, and 374 against the biasing action of the several springs 340 so as to disengage these pawls from the toothed portion of the rack 295. It may be mentioned here that this stripping action does not normally occur with the jump rack 295 in the position shown in Fig. 7. This action normally occurs with the rack 295, including the attached stop 302, displaced substantially to the left of the illustrated position. As will appear hereinafter, the stripping of the pawls as above described, enables the rack 295 to return to the position of Fig. 7.

A wire guide return solenoid 412 having a movable armature 413 is mounted on top of the plate 400, as illustrated in Figs. 6 and 7. The armature 413, upon energization of the solenoid 412, moves forcefully into engagement with the cross bar 408 of the tripper 404 and thus is adapted to effect the aforementioned clockwise rotation of the latter. A tension spring 415 is hooked to the opposite end of the armature 413 and is effective upon deenergization of the solenoid 412 to return the armature 413 to the position illustrated in Fig. 7. The spring 415 is anchored by means of a hook assembly 416 appropriately secured to the top of the cylinder assembly 372.

A jump rack return cylinder assembly 420 forms a part of the jump mechanism 73 and comprises a cylinder 421 one end of which is received in a block 422 and the other end of which is closed by a clamp member 423 (Figs. 2, 3, 6, and 7). Both of the members 422 and 423 are appropriately secured to the cylinder 421, as by welding, and provide means by which the assembly 420 is mounted. Thus, the block 422 has channels formed on opposite sides to receive tie bars 425 which extend forwardly, or to the right in the several figures of the drawing, for attachment to the outside surfaces of the rack gibs 296 and 297. These tie bars 425 are appropriately bolted both to the block 422 and to the rack gibs 296 and 297. The clamp member 423 extends upwardly above the cylinder 421 and embracingly engages the aforementioned supply pipe 398, being securely clamped thereto by means of a screw 427. It is apparent that this arrangement enables the cylinder asssembly 420 to move in correspondence with the reciprocable base 290 and the several elements attached thereto.

An air pipe 430 is connected into the clamp member 423 so as to communicate with the interior of the cylinder 421. It will be noted that both this pipe 430 and the previously mentioned supply pipe 398 extend beyond the end of the table 80 where they are provided with appropriate pipe fittings, including individual disconnect elements 431 and 432. Thus, as best shown in Fig. 2, the supply pipe 398 is connected through the disconnect fitting 432 to a flexible hose 433, and the air pipe 430 is connected through the disconnect fitting 431 to a flexible hose 434.

These hoses 433 and 434 are connected, respectively, to air pressure regulators 435 and 436, each of the latter being also connected through opposite ends of a side outlet T 437 to the aforementioned air manifold 203. As illustrated in Fig. 2, the side outlet T 437 may be utilized for supporting the pressure regulators 435 and 436 by connecting the same to an appropriate bracket 438 bolted to the underneath side of the table 80.

Preferably, a small surge or balance tank 439 is connected between the pressure regulator 436 and the flexible hose 434 attached thereto. This balance tank 439 may take any convenient form and is shown as a simple welded cylindrical receptacle having a single opening connected into a side outlet L 440 by means of which the hose 434 is also connected into the regulator 436.

As shown in Fig. 7, the right-hand end of the cylinder 421 remains open so as to receive the left-hand end of the jump rack 295. A close fitting piston 441 is slidably disposed interiorly of the cylinder 421 and normally remains in abutting relation with the received end of the jump rack 295.

*The reciprocating assembly*

From the foregoing description of the jump mechanism 73, it is apparent that all of the elements forming a part of this mechanism with the exception of the gibs 292 are adapted to move back and forth, that is, alternately to the right and left, as illustrated, in unison. This reciprocating movement is in addition to the above-described relative movement between certain of the elements.

The reciprocating movement of the jump mechanism 73 is effected by means of the reciprocating mechanism 74 (Figs. 2 and 3). The mechanisms 73 and 74 are interconnected by means of an offset connector 442 bolted to the top of the block 422 and extending transversely therefrom for adjustable threaded engagement with a piston rod 443 forming part of the reciprocating mechanism 74.

The reciprocating mechanism 74 is appropriately secured to the top of the table 80 and includes a power unit 445 adapted to reciprocate its piston rod 443 at a controlled rate of speed. This power unit 445 is conventional in its construction and arrangement, and comprises an air cylinder 446 and a hydraulic cylinder 447 disposed in tandem, each provided with a piston (not shown) mounted on the common piston rod 443. The air cylinder 446 is of the double-acting type and is provided with a two-way magnetic valve 448 adapted to direct compressed air through connecting tubes 449 and 450 to opposite ends of the cylinder 446. A supply pipe 451 is provided to conduct the compressed air to the valve 448 from a source to be described hereinafter.

Reversals of the valve 448 and, hence, of the piston rod 443 are effected by virtue of the reciprocating motion transmitted to the supply pipe 398 of the jump mechanism 73. Thus, it will be noted (Fig. 2) that the supply pipe 398 has disposed thereon a pair of cams 452 which are adjustably spaced apart and retained by means of setscrews 453. A "forward" reciprocator switch 454 and a "rearward" reciprocator switch 455 are mounted adjacent the cams 452 by means of a switch bracket 456 secured to the top of the table 80. Each of the switches 454 and 455 has a depending actuating arm 457 adapted for actuating engagement by one of the cams 452 upon appropriate movement of the supply pipe 398. The switches 454 and 455 are electrically connected to the valve 448, and it will be understood that, except for certain circumstances to be described hereinafter, alternate actuation of the switches by the cams 452 is effective to cause corresponding reversals of the reciprocatory mechanism 74 and thereby produce a desired reciprocating movement.

The speed of the aforementioned reciprocatory movement is adjustably controlled by the hydraulic cylinder 447 and the parts directly associated therewith. The cylinder 447 forms part of a closed hydraulic system. Besides the cylinder 447, this hydraulic system includes a conventional hydraulic accumulator 460 adapted to contain a supply of hydraulic fluid under pressure, an adjustable needle valve 461 for adjustably controlling a flow of oil therethrough, and four unidirectional check valves 462. Inasmuch as the foregoing elements are assembled in conventional arrangement in the present machine 70, it is not deemed necessary specifically to point out the interconnecting piping and fittings. Reference to the schematic diagram of Fig. 59 clearly indicates the relation of the enumerated elements one to another. It will be seen from the diagram of Fig. 59 that the closed hydraulic system is connected into opposite ends of the cylinder 447 and that the hydraulic fluid maintained under continuous pressure by the accumulator 460 is enabled to flow from one side of the cylinder piston to the other regardless of the direction of movement of the piston rod 443. It will be further noted that this flow of hydraulic fluid is directed by means of the several check valves 462 through the adjustable needle valve 461. It is obvious, therefore, that the speed of movement of the piston rod 443 may be appropriately regulated by adjustment of the needle valve 461. An inlet connection 463 is provided for replenishment of the accumulator 460 with hydraulic fluid.

*The counting mechanism*

It will, of course, be understood that the mechanical winding of stepped coils in the present machine 70 is effected through cooperation of the above described spindle assembly 72, jump mechanism 73, and oscillating mechanism 74. It has also been indicated that these operating units are under automatic control, being thereby adapted to wind stepped coils to various predetermined patterns. The counting mechanism 75 provides means for setting a desired pattern in which the number of turns in each step may be preselected. It also includes means by which the counting mechanism may be reset at predetermined periods in the chosen cycle of operation of the machine 70.

The counting mechanism 75 of the present machine 70 includes a counter box 490 of welded plate construction having its rear vertical face open. The forward vertical face of the counter box 490 is closed by a plate 491 to which are mounted a plurality of mechanical counters of conventional type, each on an appropriate bracket 492. It will be noted that the present counting mechanism 75 includes six counters designated 493 through 498, respectively, but it will be understood that in certain circumstances a greater or a lesser number of counters may be employed. Each of the counters 493 to 498 has a conventional actuating shaft 499 and a conventional reset shaft 500, these shafts 499 and 500 being provided with appropriate gears 501 and 502, respectively. Each of the counters is also provided with an electric switch (not shown) and, as is conventional with the particular type of counters employed, is adapted to actuate its switch in accordance with a predetermined setting of the particular counter. In other words, each counter 493 through 498 may be individually set to actuate its switch after a predetermined number of revolutions of its actuating shaft 499. It may be noted here that while all of these switches are of the normally open type, those associated with counters 493 through 497 have momentarily actuated closing contacts while the switch for the counter 498 has closing contacts which are maintained closed until the counter 498 has been reset.

As clearly shown in Fig. 4, the counting mechanism 75 includes parallel shafts 505 and 506, the former for simultaneously rotating all of the actuating shafts 499, and the latter for simultaneously actuating all of the reset shafts 500. To this end, the shafts 505 and 506 are provided with gears 507 and 508, respectively, engaging the appropriate gears 501 and 502. The shafts 505 and 506 are supported from the plate 491 by means of appropriate bearing blocks 510 and 511. It will be noted that the block 510 is a single bearing member supporting one end of the shaft 505, whereas the blocks 511 are double bearing members supporting both shafts 505 and 506. The shaft 505 has a chain sprocket 512 mounted thereon and is driven from the chain sprocket 188 of the spindle assembly 72 by means of a chain 513 mounted around these two sprockets and passing through an appropriate opening 514 in the plate 491. It will be understood that this arrangement provides for simultaneous rotation of the spindle 127 and the shaft 505. Where necessary, as in the presently depicted embodiment, appropriate openings such as 517 and 518 may be provided in the plate 491 to provide adequate clearance for rotation of the gears 507.

Fig. 4 shows the counter box 490 to extend substantially the length of the table 80 to which it is secured by appropriate bolts or screws. It will also be noted that an end plate 520 forming part of the box 490 depends below the table 80 and has at its lower end a horizontal outwardly extending flange 521. A conventional double acting air cylinder 522 provided with a two-way magnetic valve 523 having an appropriate piping connection to the air manifold 203 is firmly secured to the flange 521 (Figs. 2, 4, and 5). The cylinder 522 is disposed vertically and has a reciprocable piston rod 525 which extends upwardly through an appropriate opening in the flange 521 and which parallels the vertical portion of the end plate 520. The upper free end of the piston rod 525 threadedly engages a connecting element 526, this connection being secured by a jam nut 527. The upper end of the connecting element 526 is joined in similar fashion to the lower end of a reset rack 528 and secured by a jam nut 529. Thus connected, it is apparent that the reset rack 528 is vertically reciprocable upon appropriate actuation of the air cylinder 522. An L-shaped stop member 530 provided with a dog screw 531 and a jam nut 532 is secured adjacent the upper end of the plate 520 so as to dispose the dog screw 531 on the extended axis of the reset rack 528, thereby providing an adjustable limit to the upward movement of the rack 528.

As clearly indicated in Figs. 4 and 5, the reset shaft 506 extends through an appropriate opening in the end plate 520 and carries a gear 535 which is in meshing engagement with the reset rack 528. A bearing bracket 536 appropriately secured to the end plate 520 supports this extended end of the shaft 506 and also provides a mounting for a roller 537. Fig. 5 clearly shows the assembled relation of the rack 528, the gear 535, and the roller 537, and it is apparent from this figure that the roller 537 is adapted to maintain continuous meshing engagement between the rack 528 and the gear 535.

A "down" reset switch 540 and an "up" reset switch 541 (Figs. 4 and 5), each having an actuating arm 542, are mounted in vertical spaced relation on the vertical portion of the end plate 520 so that they may be alternately actuated by engagement of their respective arms 542 by a cam portion 543 formed integrally with the connecting element 526. The switches 540 and 541 are both connected to the two-way magnetic valve 523 associated with the air cylinder 522, and it will be understood that, under certain circumstances to be described hereinafter, alternate closure of the switches 540 and 541 is effective to cause respective downward and upward movement of the piston rod 525 and the various elements connected thereto. Both of the switches 540 and 541 are of the normally open type and it will be noted from Fig. 5, particularly, that a normal rest position of the piston rod 525 causes the cam portion 543 to maintain the "down" reset switch 540 in closed position.

The air system

It has been indicated in the foregoing portions of this description that certain operations of the present machine 70 are pneumatically powered. Inasmuch as the piping arrangement may be widely varied, it has been deemed unnecessary specifically to recite and to enumerate all of the pipe lines and fittings incorporated in the present machine 70. The schematic diagram of Fig. 58, however, depicts a preferred distributive arrangement wherein compressed air from any suitable source is supplied through a filter 550 to the air manifold 203. The diagram of Fig. 58 shows clearly the distribution of filtered air at line pressure to the solenoid valve 202, as well as to the valves 259, 448, and 523 associated with the double-acting cylinders 258, 446, and 522, respectively. It is also evident from this diagram that air at line pressure is supplied to each of the pressure regulators 435 and 436, and it will be understood that these regulators are effective to maintain predetermined lower pressures therebeyond. As an example of appropriate pressures, it may be mentioned that in one installation of the machine 70, the line pressure is maintained at approximately ninety pounds per square inch, which is reduced to approximately forty pounds per square inch through the "high pressure" regulator 435 and to approximately six pounds per square inch through the "low pressure" regulator 436. In some instances, it may be necessary or desirable to obtain the lower of these pressures by means of a two-stage reduction. This arrangement is depicted in the diagram of Fig. 58, wherein the pressure regulator 436 provides a first stage reduction and a pressure regulator 436' provides an appropriate second stage reduction.

The electrical control system

The present machine 70 is provided with an enclosing assembly 560 (Figs. 1, 2, and 5) including a vertical side enclosure 561 and a top cover 562. The vertical enclosure 561 may comprise a single sheet of metal bent to the shape clearly shown in horizontal section in Fig. 3. It will be noted that the enclosure 561 extends beyond the left-hand end of the table 80 so as to enclose the piping elements which overhang this end of the table. Suitable cutouts 564, 565, and 566 are provided for clearance of the member 212, the jump rack 295, and the handle of the needle valve 461, respectively.

The top cover 562 is an inverted box-like structure constructed of welded sheet metal and may be hinged to the top of the counter box 490. Preferably, one end wall and at least part of the forward side wall are inclined as clearly shown in Figs. 1 and 2 to provide an appropriate mount for the manually operated switches, as well as the indicator lights, which form a part of the electrical control of the machine 70. The line-up of the switches may, of course, be varied to suit individual preferences. In the illustrated embodiment, however, five switches are disposed parallel to the long side of the table 80 and include a selector switch 570 of the single pole double throw type having a rotatable knob for adjustment, a trip switch 571, a reset switch 572, a wire guide return switch 573, and a stop switch 574, each of these switches 571 through 574 being of the normally open push button type. Similarly, a start switch 575 of the normally open push button type, a green indicator light 576, and a red indicator light 577 are arranged parallel to one end of the table 80. In addition to these externally mounted control elements, the top cover 562 provides convenient interior space for mounting all of the remaining, heretofore unmentioned elements which comprise the electrical control for the machine 70. Inasmuch as these previously undisclosed elements which complete the control for the machine 70 are of conventional form, and since their relative locations are not critical, it has not been deemed necessary to show a specific arrangement of parts inside the top cover 562. However, the electrical hookup of the control circuit for the present machine 70 is novel and is clearly depicted in the schematic diagram of Fig. 57.

Except for the motor 77, the schematic diagram of Fig. 57 depicts all of the electrical circuits associated with the illustrated machine 70. As may be noted, power for these control circuits is taken from a 110-volt line. Certain of the circuits, however, are operated at 8-volts, the conversion from 110-volts being achieved by means of a transformer 600 having a high voltage winding 601 and a low voltage winding 602. One side of the high voltage 601 is connected directly into the line by means of a lead 603, and the other side of this winding is connected by means of a lead 604 to a contact 605 of a normally open, double throw, double pole master switch 606. This switch 606 functions as a master switch for energizing the control system as well as for starting the motor 77. It may be mounted at any point adjacent the machine 70, preferably on the supporting frame thereof. A branch lead 607 connects the lead 604 also into a contact 608 of the switch 606. One pole 609 of the switch 606 is adapted to interconnect either the contact 605 with a contact 610, or the contact 608 with a contact 611, depending on which way the switch 606 is moved. The contact 610 is connected directly into the power line by means of a lead 612. A branch lead 613 connects the contact 611 into the lead 612. Another branch lead 614 connects the lead 612 to a contact 615, this latter contact being connectible by means of a pole 616 to a contact 617. It will be noted that the contacts 615 and 617 are interconnected at the same time as the contacts 605 and 610, upon appropriate movement of the switch 606. The remaining contacts 618 and 619 are similarly interconnected at the same time as the contacts 608 and 611, but, as is apparent from the drawing, the contacts 618 and 619 have no function in the present arrangement. The contact 617 is connected by means of a lead 620 to one side of a solenoid 621, the other side of this solenoid 621 being connected by a lead 622 to the lead 603. The solenoid 621 is in the form of a motor starting solenoid and is used for starting the motor 77.

The timing mechanism 76 incorporated in the present control arrangement is of conventional form and includes a motor 630 adapted, in the depicted embodiment, to actuate seven different switches 631 through 637 in predetermined sequence. These switches 631 through 637 may be functionally identified as a motor switch 631, a stop switch 632, a reset switch 633, a restart switch 634, a trip switch 635, a jump switch 636, and a release switch 637. One form of timing mechanism that has proved satisfactory in the present arrangement is that manufactured by the Automatic Temperature Control Company. In this particular mechanism, there is provided a cam shaft which is rotated by the motor and which carries a separate cam for each switch. One complete revolution of the cam shaft effects a complete cycle of operation of the several switches, which is achieved in approximately five seconds. The individual cams are adjustable on the shaft and are of composite form so that each switch may be caused to open and to close in appropriate sequence. As indicated in Fig. 57, the switch 632 assumes a normally closed condition, whereas each of the switches 631 and 633 through 637 is normally open.

One side of the motor 630 of the timing mechanism 76 is connected by means of a lead 640 into the lead 603. The other side of the motor 630 is connected by means of a lead 641 into a normally open contact 642 of a relay 643. This relay 643 is of the latching type, and has a mechanical latch with an electrical release therefor. It has three single throw poles, two of the pole contacts being normally open and one being normally closed. A release coil 644 for releasing the latching mechanism of the relay 643 is connected by means of a lead 645 into the lead 640. This same end of the release coil 644 is connected by means of a lead 646 to one side of an operating coil 647 adapted to actuate the poles of the relay 643. The other side of this coil 647 is connected by a lead 648 to a switch 498', this switch 498' being the one previously mentioned as being incorporated in the counter 498. The other side of the switch 498' is connected by a lead 649 to one side of the make and break assembly 204, and the other side of the assembly 204 is connected by a lead 650 into the lead 604.

A relay 655 is provided and is identical with the relay 643 except that in the relay 655 two of the pole contacts are normally closed and one is normally open. An operating coil 656 of the relay 655 has one side connected by means of a lead 657 into the lead 603, and the other side connected by a lead 658 to one side of the previously mentioned selector switch 387. The other side of this selector 387 is connected by 659 into the lead 648. A lead 660 connects one side of the previously mentioned red indicator light 577 into the lead 657, and a lead 661 connects the other side of the light 577 into the lead 604. A release coil 663 of the relay 655 is connected from one side by means of a lead 664 into the lead 660, and from the other side by means of a lead 665 to one side of the switch 637. A lead 666 extends from the lead 665 to the hitherto unmentioned side of the release coil 644. The other side of the switch 637 is connected by a lead 667 into the lead 604.

The previously mentioned green indicator light 576 is connected from one side by means of a lead 670 into the lead 603 and from the other side by means of a lead 671 to a normally closed contact 672 of the relay 643. A pole 673, which cooperates with the contact 672, is connected by a lead 674 into the lead 604, and a pole 675, which cooperates with the contact 642, is connected by a lead 676 into the lead 604.

A coil 412' forming part of the previously mentioned wire guide return solenoid 412 has one end connected by a lead 680 into the lead 603 and the other end connected by a lead 681 into one side of the previously mentioned wire guide return switch 573. The other side of the switch 573 is connected by a lead 682 into the lead 604.

A coil 202' forming part of the previously mentioned solenoid operated air valve 202 has one side connected by means of a lead 683 into the lead 603 and the other side connected by a lead 684 into one side of the previously mentioned trip switch 571. The other side of the switch 571 is connected by a lead 685 into the lead 604. A normally open contact 686 of the relay 655 is connected by a lead 687 into the lead 684. A lead 688 connects one side of the switch 631 into the lead 685, and a lead 689 connects the other side of this switch 631 into the lead 641. A lead 690 connects one side of the switch 635 into the lead 604, and the other side of this switch 635 is connected by a lead 691 to a pole 692 cooperative with the contact 686 of the relay 655.

The low voltage winding 602 of the transformer 600 has leads 700 and 701 extending from opposite sides thereof. The lead 700 connects into a coil 523" which forms part of the previously mentioned two-way magnetic valve 523, this coil 523" being effective to instigate a return movement of the reset mechanism. The other side of the coil 523" is connected by a lead 702 to one side of the previously mentioned switch 541, and the other side of this switch is connected to the lead 701. A coil 523', which also forms part of the two-way magnetic valve 523, and which is effective to instigate the reset action, has one side connected to the lead 700 by a lead 703. The other side of the coil 523' is connected by a lead 704 to one side of the previously mentioned switch 540, and the other side of the switch 540 is connected by a lead 705 to one side of the previously mentioned reset switch 572. A lead 706 connects the other side of the switch 572 into the lead 701.

A coil 259' forming part of the previously mentioned two-way magnetic valve 259, and being effective to instigate rotation of the spindle 127, is connected by a lead 707 into the lead 700. The other side of the coil 259' is connected by a lead 708 to one side of the previously mentioned start switch 575. The other side of this switch 575 is connected by a lead 709 into the lead 701. A lead 710 connects a normally closed contact 711 of the relay 655 into the lead 708. A pole 712 cooperative with the contact 711 is connected by a lead 713 to one side of the switch 634, the other side of this switch 634 being connected by a lead 714 into the lead 701. A lead 715 connected to the lead 714 extends to one side of the switch 633, and a lead 716 extends from the other side of the switch 633 to the lead 705.

A coil 259" forming part of the two-way magnetic valve 259, and being effective to stop the rotation of the spindle 127, is connected at one side by a lead 720 into the lead 700, and at the other side by a lead 721 to one side of the previously mentioned stop switch 574. The other side of the switch 574 is connected by a lead 722 into the lead 701. A lead 723 extends from the lead 721 to one side of the switch 632, and the other side of the switch 632 is connected by a lead 724 to a normally open contact 725 of the relay 643. A pole 726 cooperative with the contact 725 is connected by a lead 727 into the lead 701.

A coil 396' forming part of the previously mentioned two-way magnetic valve 396, and being effective to instigate a jump of the rack 295, has one side connected by a lead 730 into the lead 700 and the other side connected by a lead 731 to a normally closed contact 732 of the relay 655. A pole 733 cooperative with the contact 732 is connected by a lead 734 to one side of the switch 636. The other side of the switch 636 is connected by a lead 735 into the lead 701. The last-mentioned end of the coil 396' is also connected by a lead 736 to one side of a switch 497', this switch being the one previously mentioned as being associated with the counter 497. The other side of the switch 497' is connected by a lead 737 into the lead 701. A lead 738 extends from the lead 736 to one side of a switch 493', which switch is the one previously mentioned as being associated with the counter 493. The other side of the switch 493' is connected by a lead 739 into the lead 701. Parallel leads 740, 741, and 742, each connected with the lead 738, extend, respectively, to one side of switches 494', 495', and 496'. These switches 494', 495', and 496' are the ones previously mentioned as being associated with the counters 494, 495, and 496, respectively. Parallel leads 743, 744, and 745 connect the other sides of the respective switches 494', 495', and 496' into the lead 701.

A coil 448' forming part of the previously mentioned two-way magnetic valve 448, and being effective to instigate rearward movement of the reciprocating mechanism, has one side connected by a lead 750 into the lead 700 and the other side connected by a lead 751 to one side of the previously mentioned "rearward" reciprocating switch 455. The other side of the switch 455 is connected by a lead 752 to one side of the previously mentioned reciprocator cut-off switch 275 and the other side of this switch 275 is connected by a lead 753 into the lead 701. A coil 448" forming part of the two-way magnetic valve 448, and being effective to instigate a forward reciprocation of the reciprocating mechanism, has one side connected by a lead 754 into the lead 700, and the other side connected by a lead 755 into one side of the previously mentioned "forward" reciprocating switch 454. The other side of this switch 454 is connected by a lead 756 into the lead 701.

A coil 396" forming part of the previously mentioned two-way magnetic valve 396, and being effective to instigate a return of the jump mechanism, has one side connected by a lead 757 into the lead 700 and the other side connected by a lead 758 to one side of the previously mentioned jump return switch 385. The other side of the switch 385 is connected by a lead 759 into the lead 701.

*Operation*

As previously mentioned, the machine 70 of the present invention is adapted to wind coils having a selected number of steps and a selected number of turns per step within the predetermined capacity of the machine. Such a coil is illustrated in Figs. 60 and 61 of the drawings, being designated by the numeral 710 therein. It will be noted that the illustrated coil 710 is composed of a single length of magnet wire 711 and has twelve steps so arranged as to be accommodated in the slotted stator core of a four-pole electric motor, the opposite sets of pole windings being joined by an extended loop 712. It will be further understood that each of the twelve steps of the coil 710 may have any predetermined number of turns within the predetermined capacity of the machine.

Assuming the machine 70 to have been previously brought to a normal rest position, the jump mechanism 73 will be at the right-hand limit of its movement and the jump rack 295 carrying the wire guide assembly 279 will be in its extreme right-hand position relative to the remainder of the jump mechanism 73. The shifter element 175 of the double clutch assembly 148 will be in position for compressing the clutch plates 149, which, as previously mentioned, prevents rotation of the spindle assembly 72.

The machine 70 is prepared for operation by admitting compressed air at appropriate line pressure to the air system as shown in Fig. 58 and by operating the master switch 606 in conventional manner to start the prime mover and to energize the electrical system depicted diagrammatically in Fig. 57. It will be understood that the hydraulic accumulator 460 maintains continuous pressure in the closed hydraulic system, shown in Fig. 59, and that it is only necessary to make periodic checks to assure that the fluid in the system has not been depleted by leakage.

With the prime mover 77 running, the driving cup 157 and those clutch plates engaged therewith will be continuously rotated, but will not, under the assumed conditions for starting, be effective to rotate the remaining elements of the spindle assembly 72.

Once the electrical system of Fig. 57 is energized, the leads 603 and 604 connected to opposite sides of the line will remain energized, as will also the transformer 600, and, hence, the low voltage leads 700 and 701. The red indicator light 577, being connected directly across the leads 603 and 604, burns continuously whenever the electrical system is energized. Under the assumed starting conditions, the green indicator light 576 will also burn by virtue of its circuit being completed through the normally closed contact 672 of the relay 643. Also, before the operation is started, all of the various switches in the electrical system are in their aforementioned normal condition of closure, with the exceptions of the selector switch 387, which is held in closed position by the rack 295, and the "rearward" reciprocator switch 455, which is held closed by virtue of the jump mechanism 73 being in its extreme right-hand position wherein the actuator 456 of this switch is engaged by one of the cams 452. It will be noted from the diagram of Fig. 57, however, that neither of these latter switches is effective to complete a circuit before the start of operation. It will be evident, therefore, that with the exception of the indicator light circuits aforementioned, none of the operating elements of the electrical system will be energized before the start of operations.

With the electrical system energized, the next step is to move the slide 225 to closed position as indicated in Fig. 8 and, as here demonstrated, to assemble four coil forms 245 and a cross-over plate 256 on the arbor assembly 210 in the manner best shown in Figs. 2 and 3. The magnet wire 711, which normally comes in spools, is then threaded around the wire guide and tensioning means and up through the wire guide and support assembly 279 as clearly shown in Fig. 1, the free end of the magnet wire 711 being finally engaged with the outer end of an appropriate coil form 245. As far as the operator is concerned, there now remains only to push the start switch 575 and to await the completion of a coil 710, during which time the attention of the operator may be directed to other work. When the coil 710 is completed, the machine 70 will automatically stop with the slide 225 in the open position of Fig. 20. This position of the slide 225 relaxes the tension in the windings of the coil 710 so that it, along with the coil forms 245 and the cross-over plate 256, may be easily removed from the arbor assembly 210. Thus, it is a simple matter for the operator to clip the wire 711 by obvious manipulation of the wire cutting assembly 280 and to strip the arbor assembly 210. The wire guide return switch 573 may then be depressed to return the wire guide assembly 279 to its starting position, whereupon the same or duplicate coil forms 245 and cross-over plate 256 may be replaced upon the arbor assembly 210, the magnet wire 711 re-engaged therewith, and the push-button switch 575 actuated to begin another coil 710.

Considering the operation of the machine 70 more in detail, it will be noted that the closing of the start switch 575 completes a circuit through the coil 259' of the two-way magnetic valve 259. This causes the double-acting air cylinder 258 to be actuated in a direction to move the shifter element 175 of the double clutch assembly 148 so as to release the braking action of the plates 149 and to compress the plates 155 which thereby become effective to rotate the whole of the spindle assembly 72, including the coil forms 245 and the cross-over plate 256 assembled thereon. Immediately then, the magnet wire 711 begins to wind upon the first or right-hand step of the outer coil forms 245. As previously mentioned, however, the movement of the double clutch assembly 148 to driving position effects a closed condition of the reciprocator cut-off switch 275, which, in view of the above-mentioned closed condition of the "rearward" reciprocator switch 455 effects energization of the coil 448' of the two-way magnetic valve 448. This actuation of the valve 448 causes the power unit 445 to retract its piston rod 443, thereby causing the whole jump mechanism 73 to move rearwardly until the left-hand cam 452 engages the actuating arm 457 of the "forward" reciprocator switch 454. This actuation of the switch 454 completes a circuit through the coil 448" which effects a reversal of the valve 448 and, hence, of the power unit 445. It may thus be seen that the whole jump mechanism 73 is caused continuously to reciprocate back and forth as long as the reciprocator cut-off switch 275 is maintained in closed condition, it being understood, of course, that the alternate actuation of the switches 454 and 455 by the cams 452 controls the reciprocation of the reciprocating mechanism 74. The speed of the reciprocating movement may be regulated in conventional manner by appropriate manipulation of the handle of the adjustable needle valve 461 of the reciprocating mechanism 74. The extent of movement in the reciprocations of the jump mechanism 73 is readily adjustable by movement of the cams 452 and should be approximately equal to the width of the spacers 249, 250, and 251 of the coil forms 245, so that, inasmuch as the wire guide and support assembly 279 is caused to reciprocate along with the rest of the jump mechanism 73, the magnet wire 711 will be wound uniformly over the width of the several spacers 249, 250 and 251.

From the previous description of the machine 70, it is apparent that rotation of the spindle assembly 72 effects a like rotation of the shaft 505 which simultaneously drives all of the actuating shafts 499 of the counters 493 through 498. It will be understood, of course, that the driving connection between the rotating spindle assembly 72 and the counters 493 through 498 is such as to cause the latter to register the actual revolutions of the arbor assembly 210 and the coil forms mounted thereon. Thus, the counters 493 through 498, having been previously set for actuation of their respective switches after appropriate progressively accumulating numbers of revolutions in accordance with the number of turns desired on the individual steps of the coil forms 245, the switch 493' of the counter 493 will eventually be actuated. When this happens, the coil 396' of the two-way magnetic valve 396 is energized and causes the double-acting air cylinder 395 to retract its piston rod 371. The latter, by virtue of its connection to the reciprocating pawl block 370 and the pawl 374 effects a rearward movement of the jump rack 295 a distance at least equal to the length of the aforementioned long tooth 306. By the time the pawl block 370 has reached the end of this rearward movement, however, the pin 378 mounted therein has engaged the actuating arm 386 of the pump return switch 385, thereby effecting energization of the coil 396" of the valve 396 and effecting an immediate return of the pawl 374 to its previous position. In the meantime, the "long" pawl 338 has caught the next tooth 305 so as to retain the jump rack 295 in its jumped position. The spindle assembly 72 continues to rotate without interruption during this movement of the jump rack 295, and the whole jump mechanism 73 continues to reciprocate back and forth.

The jump mechanism 73 is actuated in similar manner upon closure of each of the switches 494' through 497' with the result that the wire 711 is guided over successive steps of the outermost coil forms 245 to complete the first six steps of the coil 710. When, ultimately, the winding of the sixth step of the coil 710 is completed, the switch 498' of the counter 498 will be closed and, upon the immediately following closure of the breaker assembly 204, the latter obviously making a closed contact once for each revolution of the spindle 127, a circuit will be completed through the coil 647 of the relay 643. It may also be mentioned here that the last previously executed jump of the rack 295 has positioned the depression 308 in the side thereof opposite the balls 317 disposed in the hole 316 of the gib 297, whereby the lever 346 is enabled to pivot and to allow the selector switch 387 to assume an open condition. It will be noted from the electrical diagram of Fig. 57 that this open condition of the switch 387 prevents energization of the coil 656 of the relay 655 at this point in the operation.

The aforementioned energization of the coil 647 of the relay 643 effects simultaneous movement of the poles 675, 726 and 673, the first two into engagement with the contacts 642 and 725, respectively, and the latter out of engagement with the contact 672. These poles are retained in their moved positions by means of a conventional mechanical latching arrangement susceptible to release upon energization of the release coil 644, as will appear. The separation of the poles 673 from the contact 672 breaks the circuit through the green indicator light 576. In its darkened condition the light 576 indicates to the operator that a reconditioning sequence is taking place.

Simultaneously with the breaking of the circuit through the green indicator light 576, the spindle 127 is brought to a halt and the aforementioned reconditioning sequence is initiated. The halting of the spindle 127 is achieved through engagement of the pole 726 with the contact 725, thereby completing a circuit through the normally closed switch 632 and the coil 259" of the two-way magnetic valve 259. The resulting actuation of the valve 259 causes the double-acting air cylinder 258 to be actuated in a direction to move the shifter element 175 of the double clutch assembly 148 so as to release the driving action of the plates 155 and to compress the plates 149, thereby providing a braking action which brings the spindle 127 to a quick stop. Also, this actuation of the double clutch assembly 148 permits the reciprocator cut-off switch 275 to open, with the result that the reciprocations of the jump mechanism 73 are halted upon the first subsequent return of the jump mechanism to its forward limit of reciprocation. The reconditioning sequence is initiated upon engagement of the pole 675 with the contact 642 which completes a circuit through the timing motor 630, which, as aforementioned, is adapted to cause a predetermined sequential actuation of the switches 631 through 637.

Inasmuch as the present machine 70 is provided with only six counters, 493 through 498, each of which has been actuated once during the winding of the first six steps of the coil 710, it is obvious that the counters must be reset to their starting positions before starting to wind the last six steps of the coil 710. Also, the wire guide assembly 279 must be jumped to a new position in order to lead the magnet wire 711 across the cross-over plate 256 and on to the first step of the inner coil forms 245. It is the function of the timing mechanism 76 thus to prepare or condition the machine 70 for continued winding of the coil 710 and, in addition, to instigate renewed rotation of the spindle 127.

As above-mentioned, the closing of the relay 643 effects an immediate stoppage of the spindle 127 by completing a circuit through the normally closed switch 632 of the timing mechanism 76. Since the stop circuit thus established must be interrupted before the spindle 127 can be restarted and, inasmuch as the depicted embodiment of the machine 70 requires the relay 643 to be maintained in closed condition until after the restarting of the spindle 127, the cam operated stop switch 632 may be caused to open very soon after the commencement of rotation of the timing motor 630. The switch 632 is maintained in open condition by means of its associated cam until after the relay 643 has been released, as will appear.

The resetting of the counters 493 to 498 is effected by closure of the switch 633, the actuation of which may also follow immediately after the commencement of rotation of the timing motor 630. From Fig. 57 it may be seen that the closing of the switch 633 completes a circuit through the coil 523' of the two-way magnetic valve 523. It will be noted that this circuit extends through the "down" reset switch 540, which is at this time held closed by the cam portion 543 of the connecting element 526. The energization of the coil 523' of the valve 523 causes the air cylinder 522 to be actuated in a manner to retract its piston rod 525 and the attached rack 528, thereby rotating the main reset shaft 506 and, hence, the individual reset shafts 500. As the cam portion 543 moves downwardly, it releases the switch 540 to its normally open condition and eventually engages the "up" reset switch 541. Thus, the circuit established through the coil 523' is interrupted and there is subsequently established a circuit through the closed switch 541 and the coil 523". This latter circuit is effective to reverse the air cylinder 522 so as to return all of the resetting mechanism to its original condition, the circuits through the coil 523" being, of course, interrupted upon disengagement of the cam portion 543 from the switch 541. Inasmuch as the return of the cam portion 543 to its original position again closes the "down" reset switch 540, it is desirable that the cams associated with the reset switch 633 of the timing mechanism 76 be set for substantially momentary closure in order that the counter resetting cycle be not needlessly repeated. In cases where it is desirable, however, the cam operated switch 633 may be adjusted to provide for more than a single operation of the reset mechanism.

The actuation of the jump mechanism 73 may also follow very soon after the commencement of rotation of the timing motor 630 and is instigated by closure of the switch 636, which completes a circuit through the normally engaged pole 733 and contact 732 of the relay 655 and through the coil 396' of the two-way magnetic valve 396. This energization of the coil 396' initiates a reciprocation of the jump mechanism 73 similar to those previously described. In this particular jump, however, the "long" pawl 338 rides over the "long" tooth 306, catching on the shoulder of the same and retaining the jump rack 295 and the attached wire guide assembly 279 in a position slightly farther advanced than in the previously described actuation of the jump mechanism 73. This provides compensation for the thickness of the cross-over plate 256 interposed between the outer and inner coil forms 245. It will be obvious, of course, that further actuations of the jump mechanism 73 can result only in advancement in accordance with the length of the teeth 305 of the rack 295. Inasmuch as the coil 396' must be deenergized before the coil 396" can effect the return movement of the air cylinder 395 and the reciprocating pawl 374 connected thereto, the closure of the jump switch 636 of the timing mechanism 76 is preferably substantially momentary.

With the reset operation instigated by the switch 633 and the jump operation instigated by the switch 636 completed, the rotation of the spindle 127 may be renewed for continued winding of the coil 710. The restart of the spindle 127 is effected, as was the original start, through energization of the coil 259' of the two-way magnetic valve 259, thereby again initiating the previously described actuation of the double clutch assembly 148 and the subsequent continuous actuation of the reciprocating mechanism 74.

Although winding of the coil 710 has now been continued, the timing mechanism 76 has not yet completed its cycle of operation. It has yet to release the relay 643 for return to normal condition and to reestablish the original condition of each of the switches 631 through 637. Before the relay 643 can be unlocked or released, two additional conditions must be fulfilled. The first of these, for a reason to be made apparent hereinafter, is the reopening of the restart switch 634, the closure of which may obviously be only momentary, and the second is the closing of the motor switch 631. It is apparent from Fig. 57 that the motor switch 631 may be caused to close any time after initial energization of the timing motor 630 and serves to complete a second circuit through the motor 630, this second circuit being independent of the relay 643 and, hence, serving to maintain the motor 630 in operation after the return of the relay 643 to normal condition. With the two conditions aforementioned having been met, the release switch 637 of the timing mechanism 76 is closed so as to complete a circuit through the release coil 644 of the relay 643. Energization of the release coil 644 effects release of the mechanical latch and permits the opening of the relay 643, the circuit through the operating coil 647 having been previously interrupted upon the opening of the counter switch 498" during reset of the counter mechanism. As the relay 643 drops out, the pole 673 thereof again engages the contact 672, thereby reenergizing the green indicator light 576 to signal the return to coil winding condition.

As above-mentioned, the timing motor 630 continues to operate after the opening of the relay 643 and may now reopen the release switch 637. It may also at this time reclose the stop switch 632, which actuation will be ineffective owing to the interruption of this circuit between the pole 726 and the contact 725 of the relay 643. Finally, the motor switch 631 is caused to reopen, which causes the motor 630 to stop with the whole timing mechanism 76 in original condition.

The machine 70 proceeds to wind the last six steps of the coil 710 in exactly the same manner as the first six, the jump mechanism 73 being periodically actuated upon successive operation of the counter switches 493' through 497'. When, ultimately, the winding of the final step of the coil 710 is completed, the switch 498' of the counter 498 will again be closed and, once more, will cooperate with the breaker assembly 204 to complete a circuit through the coil 647 of the relay 643. This time, however, inasmuch as the depression 308 in the side of the rack 295 has passed beyond a position opposite the balls 317 disposed in the hole 316 of the gib 297, the selector switch 387 will have remained in closed condition with the result that a circuit will now also be completed through the coil 663 of the relay 655. Thus, in this instance, the relay 655 is closed and latched simultaneously with the relay 643, which effects disengagement of the poles 712 and 733 from the contacts 711 and 732, respectively, while at the same time closing the pole 692 upon the contact 686. The cycling of the timing mechanism 76, including release of the relay 643 is repeated exactly as above described. The effects, however, are somewhat different. The closure of the jump switch 636, for example, does not this time result in energization of the coil 396' due to the now open condition of the pole 733 and contact 732 of the relay 655. Also, the closing of the restart switch 634 does not result in the energization of the coil 259' due to the now open condition of the pole 712 and contact 711 of the relay 655. Thus, since there is no present requirement for the jump mechanism 73 to be actuated at this point in the operation of the machine 70, this operation is withheld, and since the coil 710 has now been completely wound, thereby eliminating requirement for restarting the spindle 127, this action is also withheld.

Although the operation of the trip switch 635 has not previously been described in detail, it will be understood that this switch, along with the others in the group 631 through 637, is actuated once during each cycle of operation of the timing mechanism 76. It is obvious from Fig. 57 that the closing of the switch 635 during the first described cycle of the timing mechanism 76 could have no effect owing to the then open condition of the pole 692 and contact 686 of the relay 655. However, in the present instance wherein the pole 692 and contact 686 are in closed condition, the closing of the switch 635 completes a circuit through the coil 202' of the solenoid valve 202, whereupon compressed air from the manifold 203 is directed through the flexible tube 200 and the hollow spindle 127 to the air cylinder 215. This results in actuation of the piston assembly 238 and causes the slide 225 of the arbor assembly 210 to be displaced from the position of Fig. 8 to the position of Fig. 20, thereby facilitating removal of the completed coil 710 in the manner above-described. The trip switch 635 may be caused to close immediately after the spindle assembly 72 has been stopped from rotation and need be retained in closed condition only long enough to permit appropriate displacement of the slide 225.

The ultimate closing of the release switch 635 effects simultaneous energization of both the coil 644 of the relay 643 and the coil 663 of the relay 655, the latter coil having, as a matter of fact, been also energized along with the former during the previous cycle of the timing mechanism 76. The first energization of the coil 663 was without specific effect, however, due to the already open condition of the relay 655. In the present instance, it is apparent that the relay 655 is released simultaneously with the relay 643, both returning to their normal rest condition. It may be pointed out here that release of the relay 655 results in the closing of the pole 712 upon the contact 711 which would, in the event of the restart switch 634 being closed at this point in the operation, cause the coil 259' to be energized and the spindle 127 to be restarted. To avoid this, the restart switch 634 is caused to open before the release switch 637 is closed, as previously indicated.

Upon completion of the above-described second cycle of operation of the timing mechanism 76, the machine 70 will be in its originally assumed condition for starting, except for the displacement of the jump mechanism which is now in its most remote position since the start of the operation. While automatic return of the jump mechanism to its original position could be easily incorporated in the present machine 70, it is deemed preferable to instigate this return manually after the magnet wire 711 has been clipped from the completed coil 710 in order to avoid dragging out an unnecessary length of wire at the end of the coil. After clipping the wire 711, the operator has only to depress the push-button 573 to cause immediate return of the jump mechanism to its original position. This closing of the wire guide return switch 573 completes a circuit through the coil 412' of the solenoid 412, thereby causing the armature 413 to advance and strike the cross bar 408 of the tripper 404, whereupon the latter pivots in a clockwise direction, as illustrated, to effect movement of the release bar 332 and the attached stripper 320 to the left. This movement of the stripper 320, as previously described, disengages the pawls 338, 339, and 374 from the rack 295, thus permitting the desired return movement of the latter. The necessary power for inducing the return movement of the rack 295 is derived from the jump rack return cylinder assembly 420, the piston 441 of which is continuously urged by air under control of the "low pressure" regulator 436 in a direction to return the rack 295 to starting position. It is obvious that each of the previously described jumps of the rack 295 has been made against this low pressure air, the balance tank 439 incorporated in this part of the air system having been effective to absorb the resulting surges of pressure and permitting the pressure regulator 436 to re-adjust the pressure between successive jumps.

While one full cycle of automatic operation of the machine 70 has been described, it is obvious from Fig. 57 that the apparatus of the present invention may also be operated manually. Thus, after having been once started, the machine 70 may be stopped by depressing the push-button 574 and may be restarted by again depressing the push-button 575. The counter mechanism may be re-set by depressing the push-button 572, and the solenoid 412 may be operated by depressing the push-button 573.

The machine 70 is not restricted to operation with the illustrated coil forms 245. Where, for example, it is desired to use coil forms having a lesser number of steps and still utilizing the cross-over plate 256, the jump mechanism 73 may be advanced to an appropriate starting position before the cycle of operation is begun, in order that the depression 308 in the rack 295 may be brought to the appropriate position opposite the balls 317 at the proper point in the cycle of operation.

If it is desired to eliminate the cross-over plate 256 and, therefore, to avoid the previously described "long" jump of the mechanism 73, the cam shaft 362 may be rotated to a position wherein its eccentric portion 364 will restrict movement of the reciprocating pawl 374 to a distance which is at least equal to the length of the teeth 305 of the rack 295, but which is less than the length of the "long" tooth 306. Thus adjusted, it is obvious that the jump mechanism 73 will still operate as above-described in the early part of the cycle of operation. In other words, the "long" pawl 338 will catch the shoulder of each successive tooth 305 until the tooth 306 is brought directly under the pawl 338, as illustrated in Fig. 7. Inasmuch, however, as the next following jump of the rack 295 will be of insufficient length to enable the pawl 338 to ride completely over the tooth 306, it will be the "short" pawl 339 which will engage the shoulder of the tooth 306 and since, as previously mentioned, the pawl 339 is as much shorter than the pawl 338 as the tooth 306 is longer than the teeth 305, it is obvious that this particular jump will be equal in length to those preceding it. Further, the subsequent jumps of the rack 295 will be under control of the "short" pawl 339 and will, therefore, also be equal to the length of the teeth 305.

Clearly, there has been provided an automatic coil winding machine which fulfills the objects and advantages sought therefor.

It is to be understood that the foregoing description and the accompanying drawings have been given by way of illustration and example. It is also to be understood that changes in form of the elements, re-arrangement of parts, and substitution of equivalent elements, which will be obvious to those skilled in the art, are contemplated as within the scope of the present invention which is limited only by the claims which follow.

What is claimed is:

1. An automatic coil winding machine comprising, in combination, longitudinally spaced stepped coil forms, rotatable means for rotating the coil forms, guide means for guiding wire onto the coil forms during rotation of the same, actuating means for changing the positional relationship between the guide means and the coil forms so as to guide wire successively onto different steps of each of the coil forms, control means for controlling the actuating means in predetermined accordance with the number of turns of wire wound on the different steps of the coil forms, said guide means being adapted to guide wire from the final step of one coil form to the initial step of another coil form, means mounted between adjacent coil forms for rotation therewith for drawing out a loop of wire between said final and initial steps, said guide means including a movable rack having a plurality of identical teeth plus a tooth of extra length, said single tooth being located intermediate two of said identical teeth, said actuating means including a reciprocable pawl and a pair of stationary pawls, said stationary pawls having different lengths corresponding to the lengths of said identical teeth and said single tooth, respectively, and adjustable means for controlling the length of reciprocation of said reciprocable pawl.

2. An automatic coil winding machine comprising, in combination, rotatable means for supporting coil forms in tandem relation, two stepped coil forms on said supporting means, power means for rotating said rotatable supporting means operatively connected thereto, means for guiding wire onto the steps of the stepped coil forms, reciprocable means supporting said wire guiding means including a reciprocable base and a member mounted on said base both for movement therewith and for movement relative thereto, said wire guiding means being mounted on said member, means for reciprocating said reciprocable base to guide wire onto the steps of the coil forms in layers, means for moving said member in predetermined steps in one direction to successively wind the steps of the first coil form, counting means for determining the number of turns of wire wound on each step of a coil form and for predeterminately energizing said member moving means, said counting means being actuated by said power means, reset means for zeroing said counting means, means for guiding wire from the last step of the first coil form to the first step of the second coil form, means for actuating said reset means following completion of winding of wire on the first coil form on said rotatable means to zero and to recondition the counting means preparatory to winding wire on the second coil form, means for stopping rotation of said rotatable means and means for stopping said reciprocating means, both effective immediately prior to actuation of said means for actuating said reset means and following completion of winding of the first coil form, means for effecting further rotation of said rotatable means and said counting means immediately following actuation of said means for actuating said reset means as aforesaid, means for reenergizing said reciprocating means, said reconditioned counting means being effective to permit continued step-by-step movement of said member in the same direction as aforesaid to successively wind the steps of the second coil form, means for stopping rotation of said rotatable means upon completion of winding of the last step of the coil forms thereon, means for automatically rendering the coil forms readily removable upon completion of coil winding, and means for zeroing said counting means following completion of said coil winding.

3. An automatic coil winding machine comprising, in combination, rotatable means for supporting coil forms in tandem relation, two stepped coil forms on said supporting means, power means for rotating said rotatable supporting means operatively connected thereto, means for guiding wire onto the steps of the stepped coil forms, reciprocable means supporting said wire guiding means including a reciprocable base and a member mounted on said base both for movement therewith and for movement relative thereto, said wire guiding means being mounted on said member, means for reciprocating said reciprocable base to guide wire onto the steps of the coil forms in layers, said base reciprocating means including air and hydraulic cylinders in tandem relation and a common piston shaft extending through both cylinders, said common piston shaft being secured to pistons in said two cylinders and to said base, means for moving said member in predetermined steps in one direction to successively wind the steps of the first coil form, counting means for determining the number of turns of wire wound on each step of a coil form and for predeterminately energizing said member moving means, said counting means being actuated by said power means, reset means for zeroing said counting means, means for guiding wire from the last step of the first coil form to the first step of the second coil form, means for actuating said reset means following completion of winding of wire on the first coil form on said rotatable means to zero and to recondition the counting means preparatory to winding wire on the second coil form, means for stopping rotation of said rotatable means and means for stopping said reciprocating means, both effective immediately prior to actuation of said means for actuating said reset means and following completion of winding of the first coil form, means for effecting further rotation of said rotatable means and said counting means immediately following actuation of said means for actuating said reset means as aforesaid, means for reenergizing said reciprocating means, said reconditioned counting means being effective to permit continued step-by-step movement of said member in the same direction as aforesaid to successively wind the steps of the second coil form, means for stopping rotation of said rotatable means upon completion of winding of the last step of the coil forms thereon, means for automatically rendering the coil forms readily removable upon completion of coil winding, and means for zeroing said counting means following completion of said coil winding.

4. An automatic coil winding machine comprising, in combination, rotatable means for supporting coil forms in tandem relation, two stepped coil forms on said supporting means, power means for rotating said rotatable supporting means operatively connected thereto, means for guiding wire onto the steps of the stepped coil forms, reciprocable means supporting said wire guiding means including a reciprocable base and a member mounted on said base both for movement therewith and for movement relative thereto, said wire guiding means being mounted on said member, means for reciprocating said reciprocable base to guide wire onto the steps of the coil forms in layers, said base reciprocating means including a closed fluid flow system for controlling the speed of reciprocation of said base and valve means in said fluid flow system for varying the speed of reciprocation, means for moving said member in predetermined steps in one direction to successively wind the steps of the first coil form, counting means for determining the number of turns of wire wound on each step of a coil form and for predeterminately energizing said member moving means, said counting means being actuated by said power means, reset means for zeroing said counting means, means for guiding wire from the last step of the first coil form to the first step of the second coil form, means for actuating said reset means following completion of winding of wire on the first coil form on said rotatable means to zero and to recondition the counting means preparatory to winding wire on the second coil form, means for stopping rotation of said rotatable means and means for stopping said reciprocating means, both effective immediately prior to actuation of said means for actuating said reset means and following completion of winding of the first coil form, means for effecting further rotation of said rotatable means and said counting means immediately following actuation of said means for actuating said reset means as aforesaid, means for reenergizing said reciprocating means, said reconditioned counting means being effective to permit continued step-by-step movement of said member in the same direction as aforesaid to successively wind the steps of the second coil form, means for stopping rotation of said rotatable means upon completion of winding of the last step of the coil forms thereon, means for automatically rendering the coil forms readily removable upon completion of coil winding, and means for zeroing said counting means following completion of said coil winding.

5. An automatic coil winding machine comprising, in combination, rotatable means for supporting coil forms in tandem relation, two stepped coil forms on said supporting means, power means for rotating said rotatable supporting means operatively connected thereto, means for guiding wire onto the steps of the stepped coil forms, reciprocable means supporting said wire guiding means including a reciprocable base and a member mounted on said base both for movement therewith and for movement relative thereto, said wire guiding means being mounted on said member, means for reciprocating said reciprocable base to guide wire onto the steps of the coil forms in layers, means for moving said member in predetermined steps in one direction to successively wind the steps of the first coil form, said base reciprocating means continuing its reciprocation during positioning movement of said member, counting means for determining the number of turns of wire wound on each step of a coil form and for predeterminately energizing said member moving means, said counting means being actuated by said power means, reset means for zeroing said counting means, means for guiding wire from the last step of the first coil form to the first step of the second coil form, means for actuating said reset means following completion of winding of wire on the first coil form on said rotatable means to zero and to recondition the counting means preparatory to winding wire on the second coil form, means for stopping rotation of said rotatable means and means for stopping said reciprocating means, both effective immediately prior to actuation of said means for actuating said reset means and following completion of winding of the first coil form, means for effecting further rotation of said rotatable means and said counting means immediately following actuation of said means for actuating said reset means as aforesaid, means for reenergizing said reciprocating means, said reconditioned counting means being effective to permit continued step-by-step movement of said member in the same direction as aforesaid to successively wind the steps of the second coil form, means for stopping rotation of said rotatable means upon completion of winding of the last step of the coil forms thereon, means for automatically rendering the coil forms readily removable upon completion of coil winding, and means for zeroing said counting means following completion of said coil winding.

6. An automatic coil winding machine comprising, in combination, rotatable means for supporting coil forms in tandem relation, two stepped coil forms on said supporting means, power means for rotating said rotatable supporting means operatively connected thereto, means for guiding wire onto the steps of the stepped coil forms, reciprocable means supporting said wire guiding means including a reciprocable base and a member mounted on said base both for movement therewith and for movement relative thereto, said wire guiding means being mounted on said member, means for reciprocating said reciprocable base to guide wire onto the steps of the coil forms in layers, means for moving said member in predetermined steps in one direction to successively wind the steps of the first coil form, counting means for determining the number of turns of wire wound on each step of a coil form and for predeterminately energizing said member moving means, said counting means being actuated by said power means, reset means for zeroing said counting means, means for guiding wire from the last step of the first coil form to the first step of the second coil form including means mounted between adjacent coil forms for rotation therewith for drawing out a loop of wire between said final and initial steps, means for actuating said reset means following completion of winding of wire on the first coil form on said rotatable means to zero and to recondition the counting means preparatory to winding wire on the second coil form, means for stopping rotation of said rotatable means and means for stopping said reciprocating means, both effective immediately prior to actuation of said means for actuating said reset means and following completion of winding of the first coil form, means for effecting further rotation of said rotatable means and said counting means immediately following actuation of said means for actuating said reset means as aforesaid, means for reenergizing said reciprocating means, said reconditioned counting means being effective to permit continued step-by-step movement of said member in the same direction as aforesaid to successively wind the steps of the second coil form, means for stopping rotation of said rotatable means upon completion of winding of the last step of the coil forms thereon, means for automatically rendering the coil forms readily removable upon completion of coil winding, and means for zeroing said counting means following completion of said coil winding.

7. An automatic coil winding machine comprising, in combination, rotatable means for supporting coil forms in tandem relation, two stepped coil forms on said supporting means, power means for rotating said rotatable supporting means operatively connected thereto, means for guiding wire onto the steps of the stepped coil forms, reciprocable means supporting said wire guiding means including a reciprocable base and a member mounted on said base both for movement therewith and for movement relative thereto, said wire guiding means being mounted on said member, said member including a movable rack having a plurality of identical teeth plus a tooth of extra length, said single tooth being located intermediate two of said identical teeth, said actuating means including a reciprocable pawl and a pair of stationary pawls, said stationary pawls having different lengths corresponding to the lengths of said identical teeth and said single tooth, respectively, and adjustable means for controlling the length of reciprocation of said reciprocable pawl, means for reciprocating said reciprocable base to guide wire onto the steps of the coil forms in layers, means for moving said member in predetermined steps in one direction to successively wind the steps of the first coil form, counting means for determining the number of turns of wire wound on each step of a coil form and for predeterminately energizing said member moving means, said counting means being actuated by said power means, reset means for zeroing said counting means, means for guiding wire from the last step of the first coil form to the first step of the second coil form, means for actuating said reset means following completion of winding of wire on the first coil form on said rotatable means to zero and to recondition the counting means preparatory to winding wire on the second coil form, means for stopping rotation of said rotatable means and means for stopping said reciprocating means, both effective immediately prior to actuation of said means for actuating said reset means and following completion of winding of the first coil form, means for effecting further rotation of said rotatable means and said counting means immediately following actuation of said means for actuating said reset means as aforesaid, means for reenergizing said reciprocating means, said reconditioned counting means being effective to permit continued step-by-step movement of said member in the same direction as aforesaid to successively wind the steps of the second coil form, means for stopping rotation of said rotatable means upon completion of winding of the last step of the coil forms thereon, means for automatically rendering the coil forms readily removable upon completion of coil winding, and means for zeroing said counting means following completion of said coil winding.

8. An automatic coil winding machine comprising, in combination, rotatable means for supporting coil forms in tandem relation, two stepped coil forms on said supporting means, power means for rotating said rotatable supporting means operatively connected thereto, means for guiding wire onto the steps of the stepped coil forms, reciprocable means supporting said wire guiding means including a reciprocable base and a member mounted on said base both for movement therewith and for movement relative thereto, said wire guiding means being mounted on said member, said member comprising a rack slidably mounted upon said base, a reciprocatable pawl and means for reciprocating the same mounted upon said base engageable with said rack for moving said rack in one direction, stationary pawls for preventing rack movement in the other direction, and control means for energizing said reciprocating means, means for reciprocating said reciprocable base to guide wire onto the steps of the coil forms in layers, means for moving said member in predetermined steps in one direction to successively wind the steps of the first coil form, counting means for determining the number of turns of wire wound on each step of a coil form and for predeterminately energizing said member moving means, said counting means being actuated by said power means, reset means for zeroing said counting means, means for guiding wire from the last step of the first coil form to the first step of the second coil form, means for actuating said reset means following completion of winding of wire on the first coil form on said rotatable means to zero and to recondition the counting means preparatory to winding wire on the second coil form, means for stopping rotation of said rotatable means and means for stopping said reciprocating means, both effective immediately prior to actuation of said means for actuating said reset means and following completion of winding of the first coil form, means for effecting further rotation of said rotatable means and said counting means immediately following actuation of said means for actuating said reset means as aforesaid, means for reenergizing said reciprocating means, said reconditioned counting means being effective to permit continued step-by-step movement of said member in the same direction as aforesaid to successively wind the steps of the second coil form, means for stopping rotation of said rotatable means upon completion of winding of the last step of the coil forms thereon, means for automatically rendering the coil forms readily removable upon completion of coil winding, and means for zeroing said counting means following completion of said coil winding.

9. An automatic coil winding machine comprising, in combination, rotatable means for supporting coil forms in tandem relation, two stepped coil forms on said supporting means, power means for rotating said rotatable supporting means operatively connected thereto, means for guiding wire onto the steps of the stepped coil forms, reciprocable means supporting said wire guiding means including a reciprocable base and a member mounted on said base both for movement therewith and for movement relative thereto, said wire guiding means being mounted on said member, means for reciprocating said reciprocable base to guide wire onto the steps of the coil forms in layers, control means for said base reciprocating means including a switch, said switch being in closed position during rotation of said rotatable supporting means and in open position when said rotatable supporting means is stopped, means for moving said member in predetermined steps in one direction to successively wind the steps of the first coil form, counting means for determining the number of turns of wire wound on each step of a coil form and for predeterminately energizing said member moving means, said counting means being actuated by said power means, reset means for zeroing said counting means, means for guiding wire from the last step of the first coil form to the first step of the second coil form, means for actuating said reset means following completion of winding of wire on the first coil form on said rotatable means to zero and to recondition the counting means preparatory to winding wire on the second coil form, means for stopping rotation of said rotatable means and means for stopping said reciprocating means, both effective immediately prior to actuation of said means for actuating said reset means and following completion of winding of the first coil form, means for effecting further rotation of said rotatable means and said counting means immediately following actuation of said means for actuating said reset means as aforesaid, means for reenergizing said reciprocating means, said reconditioned counting means being effective to permit continued step-by-step movement of said member in the same direction as aforesaid to successively wind the steps of the second coil form, means for stopping rotation of said rotatable means upon completion of winding of the last step of the coil forms thereon, means for automatically rendering the coil forms readily removable upon completion of coil winding, and means for zeroing said counting means following completion of said coil winding.

10. An automatic coil winding machine comprising, in combination, rotatable means for supporting coil forms in tandem relation, two stepped coil forms on said supporting means, power means for rotating said rotatable supporting means operatively connected thereto, means for guiding wire onto the steps of the stepped coil forms, reciprocable means supporting said wire guiding means including a reciprocable base and a member mounted on said base both for movement therewith and for movement relative thereto, said wire guiding means being mounted on said member, means for reciprocating said reciprocable base to guide wire onto the steps of the coil forms in layers, means for moving said member in predetermined steps in one direction to successively wind the steps of the first coil form, counting means for determining the number of turns of wire wound on each step of a coil form and for predeterminately energizing said member moving means, said counitng means being actuated by said power means, reset means for zeroing said counting means, means for guiding wire from the last step of the first coil form to the first step of the second coil form, means for actuating said reset means following completion of winding of wire on the first coil form on said rotatable means to zero and to recondition the counting means preparatory to winding wire on the second coil form, means for stopping rotation of said rotatable means and means for stopping said reciprocating means, both effective immediately prior to actuation of said means for actuating said reset means and following completion of winding of the first coil form, means for effecting further rotation of said rotatable means and said counting means immediately following actuation of said means for actuating said reset means as aforesaid, means for reenergizing said reciprocating means, said reconditioned counting means being effective to permit continued step-by-step movement of said member in the same direction as aforesaid to successively wind the steps of the second coil form, means for stopping rotation of said rotatable means upon completion of winding of the last step of the coil forms thereon, means for automatically rendering the coil forms readily removable upon completion of coil winding, means for zeroing said counting means following completion of said coil winding, and manually actuatable power means for returning the wire guiding means to initial position.

11. An automatic coil winding machine comprising, in combination, rotatable means for supporting coil forms in tandem relation, two stepped coil forms on said supporting means, power means for rotating said rotatable supporting means operatively connected thereto, means for guiding wire onto the steps of the stepped coil forms, reciprocable means supporting said wire guiding means including a reciprocable base and a member mounted on said base both for movement therewith and for movement relative thereto, said wire guiding means being mounted on said member, said member comprising a rack slidably mounted upon said base, a reciprocatable pawl and means for reciprocating the same mounted upon said base engageable with said rack for moving said rack in one direction, stationary pawls for preventing rack movement in the other direction, and control means for energizing said reciprocating means, means for reciprocating said reciprocable base to guide wire onto the steps of the coil forms in layers, means for moving said member in predetermined steps in one direction to successively wind the steps of the first coil form, counting means for determining the number of turns of wire wound on each step of a coil form and for predeterminately energizing said member moving means, said counting means being actuated by said power means, reset means for zeroing said counting means, means for guiding wire from the last step of the first coil form to the first step of the second coil form, means for actuating said reset means following completion of winding of wire on the first coil form on said rotatable means to zero and to recondition the counting means preparatory to winding wire on the second coil form, means for stopping rotation of said rotatable means and means for stopping said reciprocating means, both effective immediately prior to actuation of said means for actuating said reset means and following completion of winding of the first coil form, means for effecting further rotation of said rotatable means and said counting means immediately following actuation of said means for actuating said reset means as aforesaid, means for reenergizing said reciprocating means, said reconditioned counting means being effective to permit continued step-by-step movement of said member in the same direction as aforesaid to successively wind the steps of the second coil form, means for stopping rotation of said rotatable means upon completion of winding of the last step of the coil forms thereon, means for automatically rendering the coil forms readily removable upon completion of coil winding, means for zeroing said counting means following completion of said coil winding, release means for disengaging said rack engaging pawls including a shiftable stripper member mounted on said base for lifting engagement of said pawls in one position thereof, power means for moving said stripper member to lift said pawls, and manually actuatable power means for returning the wire guiding means to initial position following release of said pawls.

References Cited in the file of this patent

UNITED STATES PATENTS

| Number | Name | Date |
|---|---|---|
| 282,580 | Smith | Aug. 7, 1883 |

(Other references on following page)

UNITED STATES PATENTS

| Number | Name | Date |
|---|---|---|
| 508,801 | Baker | Nov. 14, 1893 |
| 511,573 | Wilkinson | Dec. 26, 1893 |
| 717,117 | Phail | Dec. 30, 1902 |
| 753,344 | Witham | Mar. 1, 1904 |
| 897,676 | Thompson | Sept. 1, 1908 |
| 1,132,464 | Elmore | Mar. 16, 1915 |
| 1,227,659 | Quackenbush | May 29, 1917 |
| 1,631,083 | Browning | May 31, 1927 |
| 1,641,300 | Spencer | Sept. 6, 1927 |
| 1,703,678 | MacNeill | Feb. 26, 1929 |
| 1,766,364 | Waller | June 24, 1930 |
| 1,807,199 | Dear | May 26, 1931 |
| 1,817,552 | Galloway | Aug. 4, 1931 |
| 1,870,933 | Strobridge | Aug. 9, 1932 |
| 1,933,320 | Eaton | Oct. 31, 1933 |
| 1,986,090 | Winters | Jan. 1, 1935 |
| 1,997,099 | Beeson | Apr. 9, 1935 |
| 2,011,114 | Papin | Aug. 13, 1935 |
| 2,030,988 | Hofstetter | Feb. 18, 1936 |
| 2,049,587 | Lehman | Aug. 4, 1936 |
| 2,122,468 | Hill | July 5, 1938 |
| 2,122,485 | Nelson | July 5, 1938 |
| 2,154,595 | Weirich | Apr. 18, 1939 |
| 2,194,248 | Saul | Mar. 19, 1940 |
| 2,269,330 | Andren | Jan. 6, 1942 |
| 2,283,393 | Simons | May 19, 1942 |
| 2,290,626 | Bosomworth | July 21, 1942 |
| 2,307,544 | Robinson | Jan. 5, 1943 |
| 2,326,498 | Rodal | Aug. 10, 1943 |
| 2,341,474 | Orr | Feb. 8, 1944 |
| 2,348,141 | Luhn | May 2, 1944 |
| 2,360,771 | Haberstump | Oct. 17, 1944 |
| 2,415,854 | Sheffield | Feb. 18, 1947 |
| 2,424,021 | Cook | July 15, 1947 |
| 2,440,665 | Jeffrey | Apr. 27, 1948 |
| 2,445,109 | Ferguson | July 13, 1948 |
| 2,457,381 | Kilholm | Dec. 28, 1948 |
| 2,468,717 | Wennberg | Apr. 26, 1949 |
| 2,475,856 | Price | July 12, 1949 |
| 2,500,933 | Dailey | Mar. 21, 1950 |
| 2,558,621 | Martilla | June 26, 1951 |
| 2,594,707 | Allen | Apr. 29, 1952 |
| 2,597,375 | Rinehart | May 20, 1952 |
| 2,600,841 | Bruestle | June 17, 1952 |
| 2,609,163 | Cesa | Sept. 2, 1952 |
| 2,624,374 | Burge | Jan. 6, 1953 |

FOREIGN PATENTS

| Number | Country | Date |
|---|---|---|
| 717,254 | Germany | Feb. 9, 1942 |